United States Patent
Zhao

(10) Patent No.: US 12,335,114 B2
(45) Date of Patent: Jun. 17, 2025

(54) COMMUNICATION METHOD AND COMMUNICATIONS DEVICE

(71) Applicant: HUAWEI TECHNOLOGIES CO., LTD., Guangdong (CN)

(72) Inventor: Xuwen Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 17/513,895

(22) Filed: Oct. 29, 2021

(65) Prior Publication Data

US 2022/0052989 A1     Feb. 17, 2022

Related U.S. Application Data

(63) Continuation of application No. PCT/CN2020/087336, filed on Apr. 27, 2020.

(30) Foreign Application Priority Data

Apr. 29, 2019   (CN) .......................... 201910357702.8

(51) Int. Cl.
| | |
|---|---|
| H04L 9/00 | (2022.01) |
| H04L 9/40 | (2022.01) |
| H04L 41/40 | (2022.01) |
| H04L 41/50 | (2022.01) |
| H04L 41/5051 | (2022.01) |
| H04W 12/06 | (2021.01) |

(52) U.S. Cl.
CPC ......... *H04L 41/5051* (2013.01); *H04L 41/40* (2022.05); *H04L 41/50* (2013.01); *H04L 63/08* (2013.01); *H04W 12/06* (2013.01)

(58) Field of Classification Search
CPC ......... H04W 12/06; H04L 41/50; H04L 63/08
USPC ............................................................ 726/9
See application file for complete search history.

(56) References Cited

U.S. PATENT DOCUMENTS

| | | | |
|---|---|---|---|
| 11,902,445 B2 * | 2/2024 | Choyi | H04L 9/3213 |
| 2017/0346704 A1 | 11/2017 | Strijkers et al. | |
| 2019/0251241 A1 * | 8/2019 | Bykampadi | H04W 12/009 |
| 2019/0253894 A1 * | 8/2019 | Bykampadi | H04L 67/51 |
| 2020/0267153 A1 * | 8/2020 | Kang | H04W 12/35 |

(Continued)

FOREIGN PATENT DOCUMENTS

| | | |
|---|---|---|
| CN | 108632216 A | 10/2018 |
| CN | 109688586 A | 4/2019 |

(Continued)

OTHER PUBLICATIONS

Huawei et al., "Clarification on service authorization and token verification", 3GPP TSG-SA WG3 Meeting #94 83-190440, Kechi (India), Jan. 28-Feb. 1, 2019, total 7 pages.

(Continued)

*Primary Examiner* — Josnel Jeudy

(57) ABSTRACT

A communication method and a communications device are provided. The communication method may include a service communication proxy (SCP) that receives a service request from a service consumer, where the service request carries a token, and the token includes a network function (NF) set identifier of a service producer. The SCP sends the service request to a service producer selected from a NF set of the service producer.

14 Claims, 14 Drawing Sheets

(56) References Cited

U.S. PATENT DOCUMENTS

2022/0095111 A1* 3/2022 Fu .................. H04L 63/0853
2023/0199497 A1* 6/2023 Krishan ............. H04L 63/0281
726/12

FOREIGN PATENT DOCUMENTS

KR 20180021630 A 3/2018
WO 2018171316 A1 9/2018

OTHER PUBLICATIONS

3GPP TR 33.855 V1.3.0 (Nov. 2018)3rd Generation Partnership Project; Technical Specification Group Services and System Aspects;Security Aspects; Study on security aspects of the 5G Service Based Architecture (SBA)(Release 16), total 51 pages.

Deutsche Telekom AG et al.,"Introduction of indirect communication between NF services, and implicit discovery", 3GPP TSG-SA2 Meeting #131 S2-1901515, Santa Cruz, Tenerife, Spain, Feb. 25-Mar. 1, 2019, total 18 pages.

Nokia, "Editor s Note on per UE subscription level authorization in NRF", 3GPP TSG SA3 Meeting #91 S3-181385, Apr. 16-20, 2018, Belgrade, Serbia, Total 8 Pages.

Nokia et al., "New Key Issue: Service access authorization within a NF Set or NF Service Set", 3GPP TSG SA WG3 (Security) Meeting #94Ad-Hoc S3-190982, Stockholm (Sweden), Mar. 11-15, 2019,total 2 pages.

Huawei et al., "New solution for service access authorization within a NF Set", 3GPP TSG-SA WG3 Meeting #95 S3-191416, Reno (US), May 6-10, 2019,total 3 pages.

Nokia et al., "eSBA communication schema Model C", 3GPP TSG-SA WG2 Meeting #130 S2-1901162, Jan. 21-25, Kochi, India,total 2 pages.

3GPP TS 29.510 V15.3.0 (Mar. 2019); 3rd Generation Partnership Project; Technical Specification Group Core Network and Terminals;5G System;Network Function Repository Services;Stage 3(Release 15),total 121 pages.

Ericsson et al.,"eSBA communication schemas related to discovery and selection", 3GPP TSG-SA WG2 Meeting #130 S2-1901402,Jan. 21-25, Kochi, India,total 6 pages.

3GPP TS 33.501 V15.4.0 (Mar. 2019), 3rd Generation Partnership Project; Technical Specification Group Services and System Aspects; Security architecture and procedures for 5G system(Release 15), total 187 pages.

Nokia et al., "New Key Issue: Service access authorization within a NF Set or NF Service Set",3GPP TSG SA WG3 (Security) Meeting #94Ad-Hoc S3-190874,Stockholm (Sweden), Mar. 11-15, 2019,total 2 pages.

3GPP TR 33.855 V1.4.0 (Mar. 2019); 3rd Generation Partnership Project; Technical Specification Group Services and System Aspects; Security Aspects; Study on security aspects of the 5G Service Based Architecture (SBA)(Release 16), total 57 pages.

D. Hardt, Ed., "The OAuth 2.0 Authorization Framework", Request for Comments: 6749,Internet Engineering Task Force (IETF),Oct. 2012,total 76 pages.

M. Jones et al.,"JSON Web Signature (JWS)", Request for Comments: 7515, Internet Engineering Task Force (IETF), May 2015,total 59 pages.

* cited by examiner

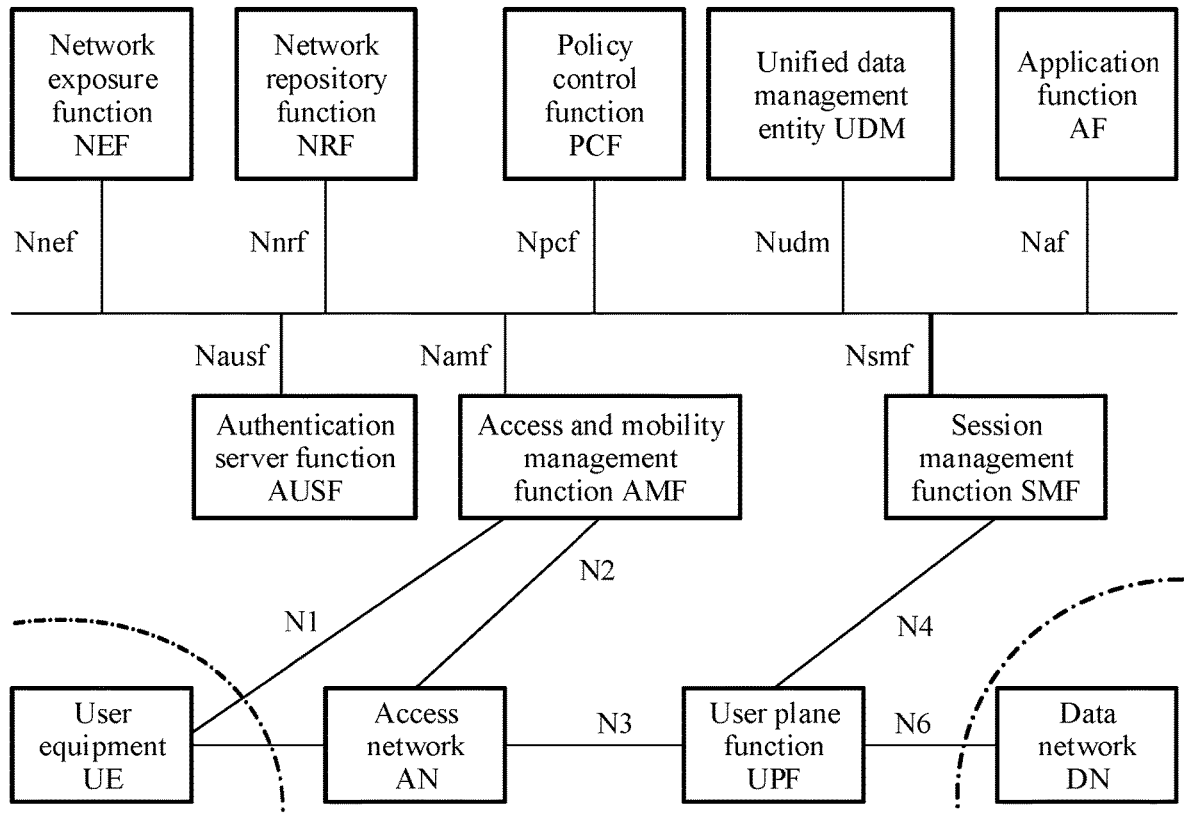
FIG. 1-A
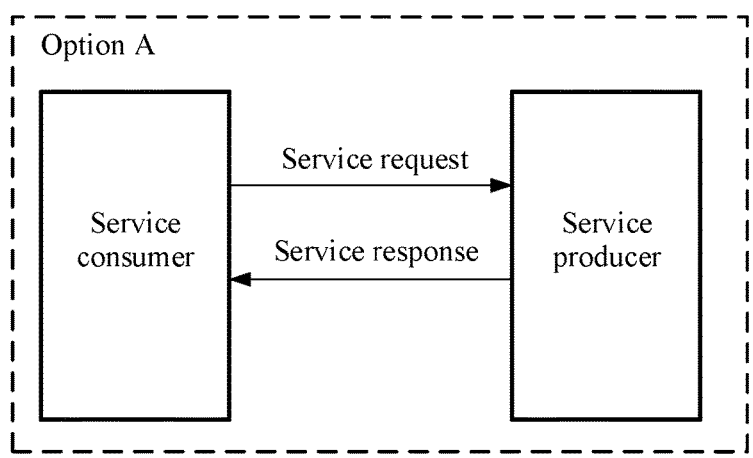
FIG. 1-B

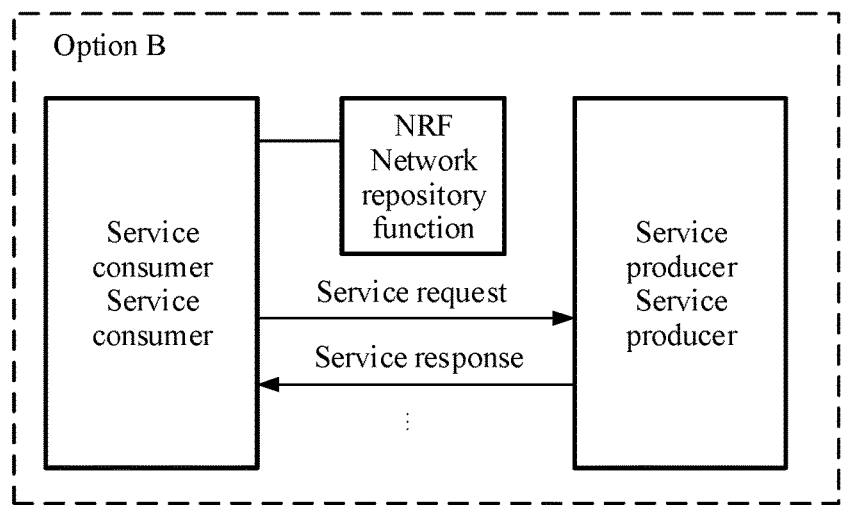
FIG. 1-C
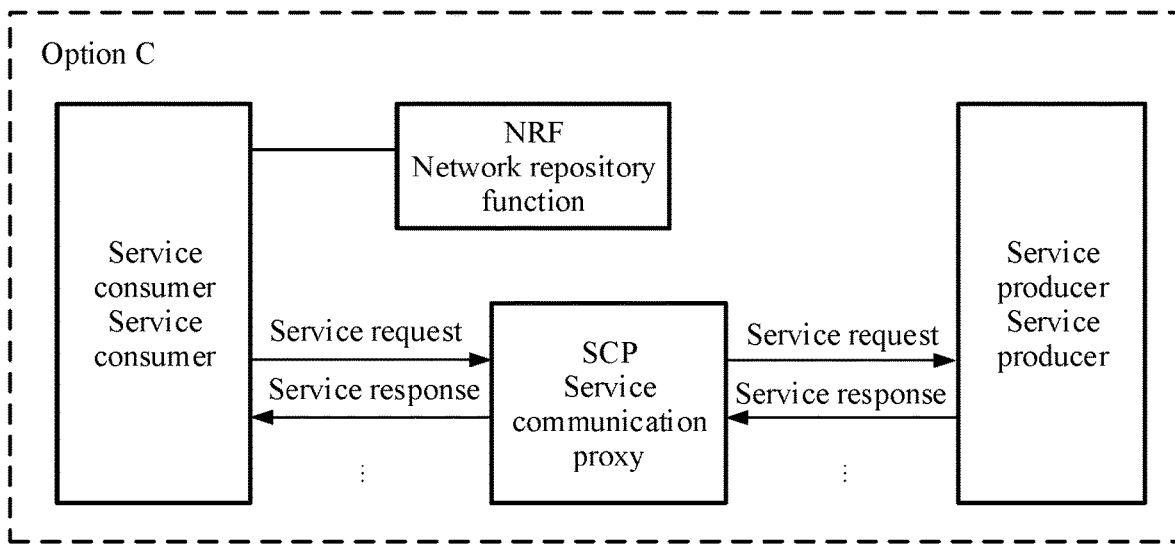
FIG. 1-D

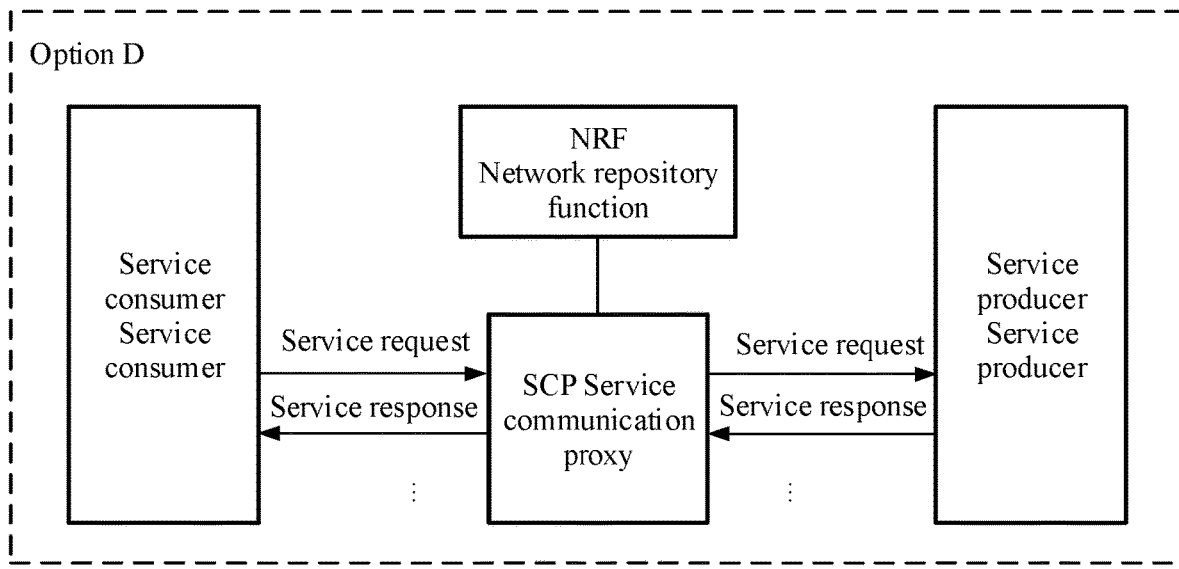
FIG. 1-E
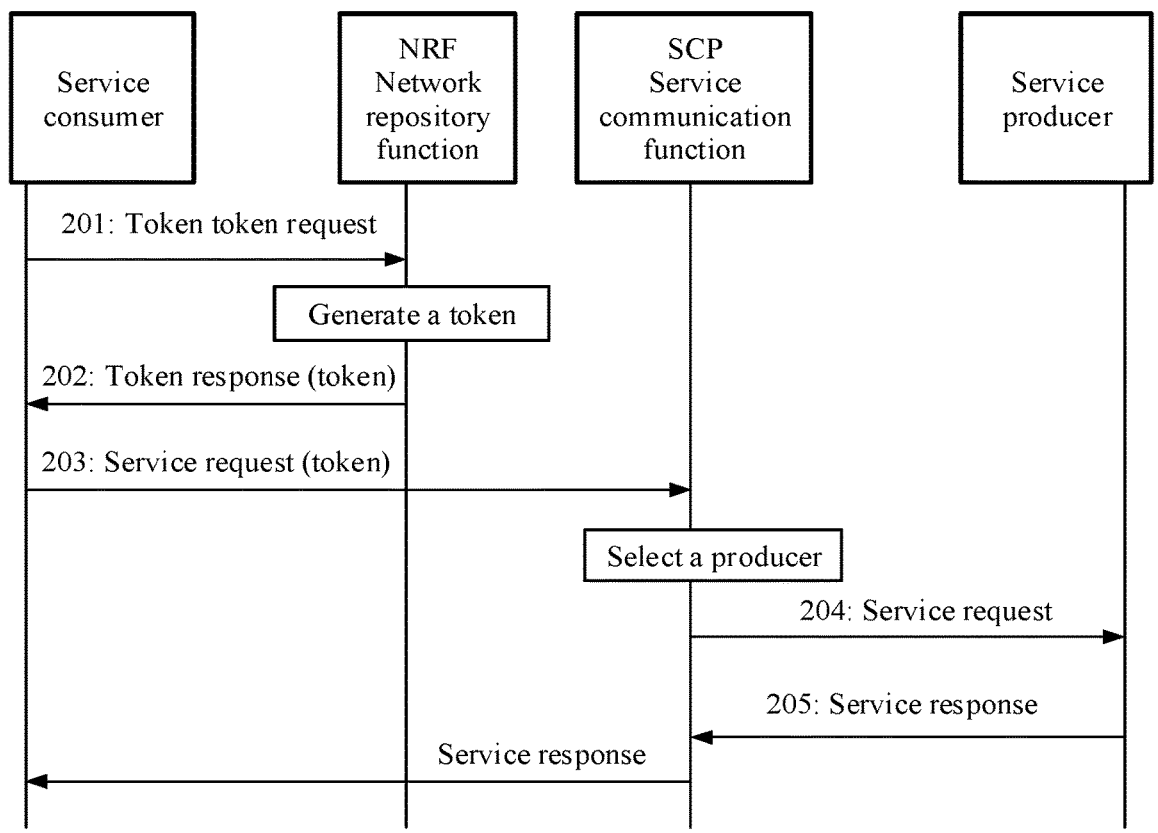
FIG. 2

COMMUNICATION METHOD AND COMMUNICATIONS DEVICE

CROSS-REFERENCE TO RELATED APPLICATIONS

This application is a continuation of International Application No. PCT/CN2020/087336, filed on Apr. 27, 2020, which claims priority to Chinese Patent Application No. 201910357702.8, filed on Apr. 29, 2019. The disclosures of the aforementioned applications are hereby incorporated by reference in their entireties.

TECHNICAL FIELD

This application relates to the field of communications technologies, and in particular, to a communication method and a communications device.

BACKGROUND

An SA2 working group of the 3rd Generation Partnership Project (3GPP) proposes an enhancement of service-based architecture (eSBA) project for a 5G core network, where a service communication proxy (SCP) and the like are introduced. The SCP may be used for indirect communication between network functions (NFs). Service invocation between the NFs may be forwarded by the SCP, and the SCP may also have functions such as NF discovery and load balancing.

Currently, an authorization implementation mechanism for a related NF in an eSBA architecture that has introduced the SCP is an important technical problem that needs to be studied in the industry.

SUMMARY

Embodiments of this application provide a communication method and a communications device.

According to a first aspect of this application, a communication method is provided, including:

a network repository function (NRF) receives a token request from a service consumer; and the NRF sends a token request response to the service consumer, where the token request response carries a token, and the token includes a NF set identifier or a NF service set identifier of a service producer.

A token including the NF set identifier of the service producer may be considered as a token for a NF set of the service producer, and is a token at a NF set granularity. A token including the NF service set identifier of the service producer may be considered as a token for a NF service set, and is a token at a NF service set granularity.

The token request may carry an identifier of the service consumer (the identifier of the service consumer is, for example, a NF instance identifier (NF Instance ID) of the service consumer).

The token request may further carry one or more of the following information: an identifier of the service producer, the NF set identifier of the service producer, or the NF service set identifier of the service producer.

It can be learned that, in the foregoing solution, the NRF generates the token based on a request of the service consumer. The token includes the NF set identifier or the NF service set identifier of the service producer. In other words, the token is a token for a NF set or a NF service set to which the service producer belongs, and the token is a token at a set granularity. The use of the token at a set granularity helps implement service control based on a NF set granularity, further helps resolve a problem that different producers in a producer set verify tokens, and helps implement convenient authorization in a set scenario in an eSBA.

For example, the method may further include: The NRF performs service authorization on the service consumer, and generates the token when service authorization on the service consumer succeeds.

The generating the token may include: If the token request carries the identifier of the service producer, the NRF obtains the NF set identifier of the service producer based on the identifier of the service producer, and generates a token including the NF set identifier of the service producer; or if the token request carries the NF set identifier of the service producer, the NRF generates a token including the NF set identifier of the service producer.

For example, when the service producer is a NF, an audience claim of the token includes the NF set identifier of the service producer.

Alternatively, when the service producer is a NF service, a scope claim of the token includes the NF service set identifier of the service producer.

According to a second aspect of this application, a network repository function (NRF) is provided, including:

a receiving unit, configured to receive a token request from a service consumer; and a sending unit, configured to send a token request response to the service consumer, where the token request response carries a token, and the token includes a NF set identifier of a service producer.

For example, the token request carries one or more of the following information: an identifier of the service producer, or the NF set identifier of the service producer.

For example, the NRF may further include a processing unit. The processing unit is configured to: if the token request carries the identifier of the service producer, obtain the NF set identifier of the service producer based on the identifier of the service producer, and generate a token including the NF set identifier of the service producer; or if the token request carries the NF set identifier of the service producer, generate a token including the NF set identifier of the service producer.

For example, when the service producer is a NF, an audience claim of the token includes the NF set identifier of the service producer.

Alternatively, when the service producer is a NF service, a scope claim of the token includes a NF service set identifier of the service producer.

According to a third aspect of this application, an NRF is provided, including a processor and a memory that are coupled to each other. The processor invokes a program stored in the memory, to perform some or all steps of any communication method provided in the first aspect.

According to a fourth aspect of this application, a computer-readable storage medium is provided. The computer-readable storage medium stores a computer program. The computer program is executed by a processor, to implement some or all of the steps of any communication method provided in the first aspect.

According to a fifth aspect of this application, a communication method is provided, including:

A service communication proxy (SCP) receives a service request from a service consumer, where the service request carries a token (this token may be generated by an NRF), and the token includes a NF set identifier or a NF service set identifier of a service producer. The SCP sends the service request to a service producer selected from a NF set or a NF service set of the service producer.

For example, when the service producer is a NF, an audience claim of the token includes the NF set identifier of the service producer.

Alternatively, when the service producer is a NF service, a scope claim of the token includes the NF service set identifier of the service producer.

It can be learned that, in the foregoing solution, the service request from the service consumer carries the token. The token includes the NF set identifier or the NF service set identifier of the service producer. In other words, the token is a token for a NF set or a NF service set to which the service producer belongs, and the token is a token at a set granularity. The use of the token at a set granularity helps implement service control based on a NF set granularity or a NF service set granularity, further helps resolve a problem that different producers in a producer set verify tokens, and helps implement convenient authorization in a set scenario in an eSBA.

The SCP may select the service producer from the NF set or the NF service set of the service producer according to a local policy and/or other information (for example, selection parameters carried in the service request).

For example, before the sending the service request to a service producer in the NF set represented by the NF set identifier, the method further includes: The SCP verifies the token included in the service request.

That the SCP sends the service request to the service producer in the NF set represented by the NF set identifier includes: When verification on the token succeeds, the SCP sends the service request to the service producer in the NF set represented by the NF set identifier.

For example, verification on the token may include integrity verification of the token and/or claim verification of the token.

For example, the claim verification of the token may include: verifying whether the NF set identifier of the service producer included in the audience claim of the token is consistent with a NF set identifier of the selected service producer; and when the two NF set identifiers are consistent, it indicates that audience claim verification of the token succeeds. For example, when the two NF set identifiers are inconsistent, it indicates that the audience claim verification of the token fails.

For another example, the claim verification of the token may include: verifying whether the NF service set identifier of the service producer included in the scope claim of the token is consistent with a NF service set identifier of the selected service producer; and when the two NF service set identifiers are consistent, it indicates that scope claim verification of the token succeeds. For example, when the two NF service set identifiers are inconsistent, it indicates that the scope claim verification of the token fails.

For example, the service request carries a service producer identifier or a service producer type, and the NF set identifier of the selected service producer is obtained based on the service producer identifier or the service producer type.

According to a sixth aspect of this application, an SCP is provided, including:

a receiving unit, configured to receive a service request from a service consumer, where the service request carries a token (this token may be generated by an NRF), and the token includes a NF set identifier or a NF service set identifier of a service producer; and a sending unit, configured to send the service request to a service producer selected from a NF set or a NF service set of the service producer.

For example, when the service producer is a NF, an audience claim of the token includes the NF set identifier of the service producer.

Alternatively, when the service producer is a NF service, a scope claim of the token includes the NF service set identifier of the service producer.

The service producer may be selected according to a local policy and/or other information (for example, selection parameters carried in the service request) from the NF set or the NF service set of the service producer.

For example, the SCP further includes a processing unit, configured to verify the token included in the service request before sending the service request to the service producer in the NF set represented by the NF set identifier.

The sending unit is specifically configured to send the service request to the service producer in the NF set represented by the NF set identifier when verification on the token succeeds.

According to a seventh aspect of this application, an SCP is provided, including a processor and a memory that are coupled to each other. The processor invokes a program stored in the memory, to perform some or all steps of any communication method provided in the fifth aspect.

According to an eighth aspect of this application, a computer-readable storage medium is provided. The computer-readable storage medium stores a computer program. The computer program is executed by a processor, to implement some or all of the steps of any communication method provided in the fifth aspect.

According to a ninth aspect of this application, a communication method is provided, including:

A service producer receives a service request sent by a service communication proxy (SCP), where the service request carries a token, and the token includes a NF set identifier of the service producer; the service producer verifies the token; and the service producer sends a response to the service request.

For example, when the service producer is a NF, an audience claim of the token includes the NF set identifier of the service producer.

Alternatively, when the service producer is a NF service, a scope claim of the token includes a NF service set identifier of the service producer.

For example, verification on the token may include integrity verification of the token and/or claim verification of the token.

For example, the claim verification of the token may include: verifying whether the NF set identifier of the service producer included in the audience claim of the token is consistent with a NF set identifier of the selected service producer; and when the two NF set identifiers are consistent, it indicates that audience claim verification of the token succeeds. For example, when the two NF set identifiers are inconsistent, it indicates that the audience claim verification of the token fails.

For another example, the claim verification of the token may include: verifying whether the NF service set identifier of the service producer included in the scope claim of the token is consistent with a NF service set identifier of the selected service producer; and when the two NF service set identifiers are consistent, it indicates that scope claim verification of the token succeeds. For example, when the two NF service set identifiers are inconsistent, it indicates that the scope claim verification of the token fails.

For example, when verification on the token succeeds, the response to the service request sent by the service producer may carry a token verification success indication. When verification on the token fails, the response to the service request sent by the service producer may carry a token verification failure indication.

According to a tenth aspect of this application, a service producer is provided, including:

a receiving unit, configured to receive a service request sent by a service communication proxy (SCP), where the service request carries a token, and the token includes a NF set identifier of a service producer;

a processing unit, configured to verify the token; and a sending unit, configured to send a response to the service request.

For example, when the service producer is a NF, an audience claim of the token includes the NF set identifier of the service producer.

Alternatively, when the service producer is a NF service, a scope claim of the token includes a NF service set identifier of the service producer.

For example, verification on the token may include integrity verification of the token and/or claim verification of the token.

For example, the claim verification of the token may include: verifying whether the NF set identifier of the service producer included in the audience claim of the token is consistent with a NF set identifier of the selected service producer; and when the two NF set identifiers are consistent, it indicates that audience claim verification of the token succeeds. For example, when the two NF set identifiers are inconsistent, it indicates that the audience claim verification of the token fails.

For another example, the claim verification of the token may include: verifying whether the NF service set identifier of the service producer included in the scope claim of the token is consistent with a NF service set identifier of the selected service producer; and when the two NF service set identifiers are consistent, it indicates that scope claim verification of the token succeeds. For example, when the two NF service set identifiers are inconsistent, it indicates that the scope claim verification of the token fails.

For example, when verification on the token succeeds, the response to the service request sent by the service producer may carry a token verification success indication. When verification on the token fails, the response to the service request sent by the service producer may carry a token verification failure indication.

According to an eleventh aspect of this application, a service producer is provided, including a processor and a memory that are coupled to each other. The processor invokes a program stored in the memory, to perform some or all steps of any communication method provided in the ninth aspect.

According to a twelfth aspect of this application, a computer-readable storage medium is provided. The computer-readable storage medium stores a computer program. The computer program is executed by a processor, to implement some or all of the steps of any communication method provided in the ninth aspect.

According to a thirteenth aspect of this application, a communication method is provided, including: A service communication proxy (SCP) receives a service request from a service consumer. The SCP performs service authorization on the service consumer or the SCP requests an NRF to perform service authorization on the service consumer. When service authorization on the service consumer succeeds, the SCP sends the service request to a service producer selected from a service producer set.

For example, the method further includes: The SCP generates a token when service authorization on the service consumer succeeds. The service request sent by the SCP to the service producer carries the token, where the token includes a NF set identifier or a NF service set identifier of the service producer.

For example, when the service producer is a NF, an audience claim of the token includes the NF set identifier of the service producer.

Alternatively, when the service producer is a NF service, a scope claim of the token includes the NF service set identifier of the service producer.

For example, that the SCP requests an NRF to perform service authorization on the service consumer includes:

The SCP sends an authorization request to the NRF, where the authorization request is used to request the NRF to perform service authorization on the service consumer; and the SCP receives a response to the authorization request sent by the NRF, where the response to the authorization request carries a service authorization result of the service consumer from the NRF, and the service authorization result is that service authorization succeeds or that service authorization fails.

For example, the service request carries a service identifier of a requested service, and that the SCP performs service authorization on the service consumer includes: determining, according to an authorization policy or authorization information locally configured by the SCP, whether the service consumer has permission to access the service that is represented by the service identifier and that is provided by the service producer.

According to a fourteenth aspect of this application, an SCP is provided, including:

a receiving unit, configured to receive a service request from a service consumer;

a processing unit, configured to perform service authorization on the service consumer, or request an NRF to perform service authorization on the service consumer; and a sending unit, configured to: when service authorization on the service consumer succeeds, send the service request to a service producer in a NF set of a service producer.

For example, the SCP generates a token when service authorization on the service consumer succeeds. The service request sent by the SCP to the service producer carries the token, where the token includes a NF set identifier or a NF service set identifier of the service producer.

For example, when the service producer is a NF, an audience claim of the token includes the NF set identifier of the service producer.

Alternatively, when the service producer is a NF service, a scope claim of the token includes the NF service set identifier of the service producer.

That the processing unit requests the NRF to perform service authorization on the service consumer includes:

sending an authorization request to the NRF, where the authorization request is used to request the NRF to perform service authorization on the service consumer; and receiving a response to the authorization request sent by the NRF, where the response to the authorization request carries a service authorization result of the service consumer from the NRF, and the service authorization result is that service authorization succeeds or that service authorization fails.

For example, the service request carries a service identifier of a requested service, and that the processing unit performs service authorization on the service consumer includes: determining, according to an authorization policy or authorization information locally configured by the SCP, whether the service consumer has permission to access the service that is represented by the service identifier and that is provided by the service producer.

According to a fifteenth aspect of this application, an SCP is provided, including a processor and a memory that are coupled to each other. The processor invokes a program stored in the memory, to perform some or all steps of any communication method provided in the thirteenth aspect.

According to a sixteenth aspect of this application, a computer-readable storage medium is provided. The computer-readable storage medium stores a computer program. The computer program is executed by a processor, to implement some or all of the steps of any communication method provided in the thirteenth aspect.

According to a seventeenth aspect of this application, a communication method is provided, including: A network repository function (NRF) receives an authorization request carrying a service consumer identifier from a service communication proxy (SCP). The NRF performs service authorization on a service consumer represented by the service consumer identifier. The NRF sends a response to the authorization request to the SCP, where the response to the authorization request carries a service authorization result of the service consumer from the NRF, and the service authorization result is that service authorization succeeds or that service authorization fails.

For example, the authorization request carries a service identifier of a requested service. The performing service authorization on a service consumer represented by the service consumer identifier includes: determining, according to an authorization policy or authorization information locally configured by the NRF, whether the service consumer has permission to access the service that is represented by the service identifier and that is provided by a service producer.

According to an eighteenth aspect of this application, a network repository function is provided, including:
a receiving unit, configured to receive an authorization request carrying a service consumer identifier from a service communication proxy (SCP);
a processing unit, configured to perform service authorization on a service consumer represented by the service consumer identifier; and
a sending unit, configured to send a response to the authorization request to the SCP, where the response to the authorization request carries a service authorization result of the service consumer from the NRF, and the service authorization result is that service authorization succeeds or that service authorization fails.

For example, the authorization request carries a service identifier of a requested service. The performing service authorization on a service consumer represented by the service consumer identifier includes: determining, according to an authorization policy or authorization information locally configured by the NRF, whether the service consumer has permission to access the service that is represented by the service identifier and that is provided by a service producer.

According to a nineteenth aspect of this application, a network repository function is provided, including a processor and a memory that are coupled to each other. The processor invokes a program stored in the memory, to perform some or all steps of any communication method provided in the seventeenth aspect.

According to a twentieth aspect of this application, a computer-readable storage medium is provided. The computer-readable storage medium stores a computer program. The computer program is executed by a processor, to implement some or all of the steps of any communication method provided in the seventeenth aspect.

According to a twenty-first aspect of this application, a communication method is provided, including:
a service consumer sends a token request to an NRF;
the service consumer receives a token request response sent by the NRF, where the token request response carries a token, and the token includes a NF set identifier or a NF service set identifier of a service producer;
the service consumer sends a service request carrying the token to a service communication proxy (SCP), where the service request is used by the SCP or the service producer to verify the token; and
the service consumer receives a response to the service request sent by the SCP.

According to a twenty-second aspect of this application, a service consumer is provided, including:
a sending unit, configured to send a token request to an NRF; and
a receiving unit, configured to receive a token request response sent by the NRF, where the token request response carries a token, and the token includes a NF set identifier or a NF service set identifier of a service producer.

The sending unit is further configured to send a service request carrying the token to a service communication proxy (SCP), where the service request is used by the SCP or the service producer to verify the token.

The receiving unit is further configured to receive a response to the service request sent by the SCP.

According to a twenty-third aspect of this application, a service consumer is provided, including a processor and a memory that are coupled to each other. The processor invokes a program stored in the memory, to perform some or all steps of any communication method provided in the twenty-first aspect.

According to a twenty-fourth aspect of this application, a computer-readable storage medium is provided. The computer-readable storage medium stores a computer program. The computer program is executed by a processor, to implement some or all of the steps of any communication method provided in the twenty-first aspect.

According to a twenty-fifth aspect of this application, a communication method is provided, including: A service consumer sends a service request to a service communication proxy (SCP), where the service request includes a NF set identifier or a NF service set identifier of a service producer. The service request is used by the SCP or a network repository function (NRF) to perform service authorization on the service consumer. The service consumer receives a service response to the service request sent by the SCP.

According to a twenty-sixth aspect of this application, a service consumer is provided, including:
a sending unit, configured to send a service request to a service communication proxy (SCP), where the service request includes a NF set identifier or a NF service set identifier of a service producer, and the service request is used by the SCP or a network repository function (NRF) to perform service authorization on the service consumer; and
a receiving unit, configured to receive a service response to the service request sent by the SCP.

According to a twenty-seventh aspect of this application, a service consumer is provided, including a processor and a memory that are coupled to each other. The processor invokes a program stored in the memory, to perform some or all steps of any communication method provided in the twenty-fifth aspect.

According to a twenty-eighth aspect of this application, a computer-readable storage medium is provided. The computer-readable storage medium stores a computer program. The computer program is executed by a processor, to implement some or all of the steps of any communication method provided in the twenty-fifth aspect.

An embodiment of this application further provides a communications apparatus, where the communication apparatus includes a processor and a memory that are coupled to each other. The processor is configured to invoke a program stored in the memory, to complete some or all of the steps of any method performed by any device provided in the embodiments of this application.

An embodiment of this application further provides a computer-readable storage medium. The computer-readable storage medium stores a program. The program is executed by a processor, to complete some or all steps of any method performed by any device provided in the embodiments of this application.

An embodiment of this application further provides a computer program product including instructions. When the computer program product is run on a computer device, the computer device is enabled to perform some or all of the steps of any method performed by any device provided in the embodiments of this application.

BRIEF DESCRIPTION OF DRAWINGS

The following describes some accompanying drawings in embodiments of this application.

FIG. 1-A is a schematic diagram of an architecture of a communications system according to an embodiment of this application;

FIG. 1-B to FIG. 1-E are schematic diagrams of architectures of other communications systems according to an embodiment of this application;

FIG. 2 to FIG. 11 are schematic flowcharts of communication methods according to an embodiment of this application;

DESCRIPTION OF EMBODIMENTS

Figure 3:
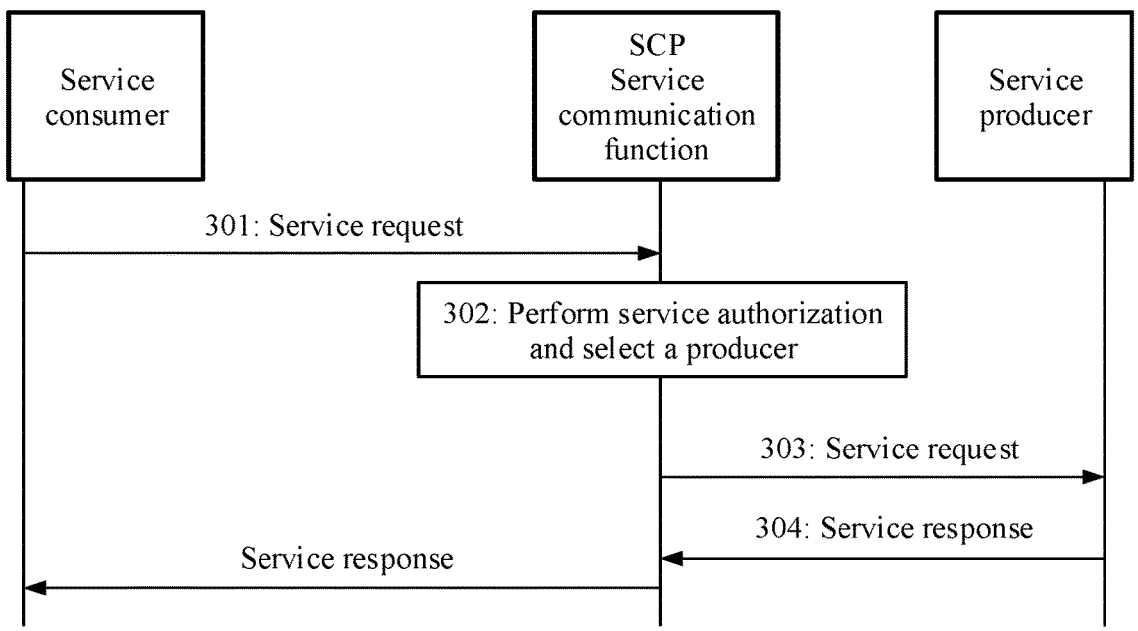

The following describes the embodiments of this application with reference to the accompanying drawings in the embodiments of this application.

FIG. 1-A is a schematic diagram of an example of a 5G network architecture according to an embodiment of this application. In a 5G network, some function network elements (for example, a mobility management entity (MME)) in a 4G network are split, and a service-based architecture is defined. In the network architecture shown in FIG. 1-A, a function similar to that of an MME in the 4G network is split into an access and mobility management function (AMF), a session management function (SMF), and the like.

The following describes some other related network elements/entities.

User equipment (UE) accesses a data network (DN) and the like by accessing an operator network, and uses services provided by an operator or a third party in the DN.

An access and mobility management function (AMF) is a control plane network element in a 3GPP network, and is mainly responsible for access control and mobility management when the UE accesses an operator network. A security anchor function (SEAF) may be deployed on the AMF, or deployed on a device other than the AMF. FIG. 1-A is an example in which the SEAF is deployed on the AMF. When the SEAF is deployed on the AMF, the SEAF and the AMF may be jointly referred to as an AMF.

A session management function (SMF) is a control plane network element in the 3GPP network. The SMF is mainly responsible for managing packet data unit (PDU) sessions of the UE. A PDU session is a channel used to transmit a PDU, and the UE and the DN may send a PDU to each other by using a PDU session. The SMF is responsible for management tasks such as establishment, maintenance, and deletion of the PDU session.

The data network (DN), also referred to as a packet data network (PDN), is a network located outside the 3GPP network. A plurality of DNs may be connected to the 3GPP network, and a plurality of services provided by an operator or a third party may be deployed in the DN. For example, a DN is a private network of a smart factory, a sensor installed in a workshop of the smart factory plays a role of the UE, and a control server of the sensor is deployed in the DN. The UE communicates with the control server. After obtaining an instruction from the control server, the UE may transfer collected data to the control server according to the instruction. For another example, a DN is an internal office network of a company, a terminal used by an employee of the company may play a role of the UE, and the UE may access internal information and other resources of the company.

A unified data management (UDM) network element is also a control plane network element in the 3GPP network. The UDM is mainly responsible for storing subscription data, credentials, permanent identifiers (subscriber permanent identifiers, SUPIs), and the like of subscribers (UEs) in the 3GPP network. The data may be used for authentication and authorization when the UE accesses a 3GPP network of an operator.

An authentication server function (AUSF) is also a control plane network element in the 3GPP network. The AUSF is mainly used for first-level authentication (that is, subscriber authentication in the 3GPP network).

A network exposure function (NEF) is also a control plane network element in the 3GPP network. The NEF is mainly responsible for exposing external interfaces of the 3GPP network to third parties in a secure manner. When a network element such as the SMF needs to communicate with a third party network element, the NEF may serve as a relay for communication. The NEF can translate internal and external identifiers when serving as the relay. For example, when sending an SUPI of the UE from the 3GPP network to a third party, the NEF may translate the SUPI into a corresponding external identity (ID). Conversely, when an external identity ID is sent to the 3GPP network, the NEF may translate the external identity ID into a corresponding SUPI.

A network repository function (NRF) is also a control plane network element in the 3GPP network. The NRF is mainly responsible for storing configurations and service profiles of accessible network functions (NFs), and providing network function discovery services for other network elements.

A user plane function (UPF) is a gateway for communication between the 3GPP network and the DN.

A policy control function (PCF) is a control plane function in the 3GPP network, and is configured to provide a policy of a PDU session for the SMF. The policy may be a policy related to charging, quality of service (QoS), authorization, and the like.

An access network (AN) is a sub-network of the 3GPP network. To access the 3GPP network, the UE needs to first access the AN. In a radio access scenario, the AN is also referred to as a radio access network (RAN). Therefore, terms "RAN" and "AN" are usually used interchangeably.

The 3GPP network is a network that complies with 3GPP specifications. In FIG. 1-A, parts other than the UE and the DN may be considered as the 3GPP network. The 3GPP network is not limited to a 5G network defined by the 3GPP, but may further include a 2G network, a 3G network, and a 4G network. Usually, the 3GPP network is operated by an operator. In addition, N1, N2, N3, N4, N6, and the like in the architecture shown in FIG. 1-A represent reference points between related network elements/network functions. Nausf, Namf, and the like represent service-oriented interfaces of related network functions.

Certainly, the 3GPP network and a non-3GPP network may coexist, and some network elements in the 5G network may also be used in some non-5G networks.

The solutions in the embodiments of this application relate to a roaming scenario and a non-roaming scenario. In the roaming scenario, a home network and a visited network exist, and architectures of the home network and the visited network may be the same or different. The home network may also be referred to as a home domain, a home network or the like. The visited network may also be referred to as a visited domain or the like.

Refer to FIG. 1-B to FIG. 1-E. FIG. 1-B to FIG. 1-E show examples of some possible network architectures in which an SCP is introduced or no SCP is introduced in an eSBA architecture. FIG. 1-B and FIG. 1-C show some possible network architectures in which no SCP is introduced. FIG. 1-D and FIG. 1-E show some possible network architectures in which an SCP is introduced.

After the SCP is introduced, some messages (for example, a service request and a service response) between a service consumer and a service producer may be forwarded by the SCP.

In description of some embodiments of this application, a service consumer is sometimes referred to as a consumer for short, and a service producer is sometimes referred to as a producer for short. A service producer set is also sometimes referred to as a producer set for short, or the like.

The methods in embodiments of this application may be specifically implemented based on the network architectures shown in FIG. 1-D (Option C) and FIG. 1-E (Option D).

Service producers in the architectures shown in FIG. 1-B to FIG. 1-E may be specifically some NFs (network functions) in a core network. There may be service-oriented interfaces between NFs in the core network. Communication between the NFs may be performed in a service invoking manner.

A network repository function (NRF) may be configured to complete NF registration, discover and store registration information of NFs in a same public land mobile network (PLMN), and the like. The NRF may also function as an authorization server to complete service authorization, and the NRF may also have a function of generating a token or verifying a token.

The service communication proxy (SCP) is mainly configured to implement communication forwarding between NFs, and may be further configured to implement load balancing and NF selection. In addition, the SCP may further have functions such as NF registration, discovery, and service authorization.

The solutions in the embodiments of this application are mainly applied to a system in which a service-oriented architecture is enhanced in a second phase of 5G.

For example, in the Option C and Option D architectures, if the service producer is a NF/NF service in a set, the SCP may select another NF/NF service from the set (the selected NF may not be a NF requested by the consumer) as the producer. In this scenario, the consumer can use authorization information of another instance in a same set as the producer to access services of the producer. For example, the consumer is previously authorized to access a NF_A in a NF set, but the NF_A cannot work due to a fault or performance problem. In this case, the SCP may directly select a NF_B in the same NF set without initiating a new authorization procedure. In this case, the consumer is authorized to access a service of the NF_B.

The solutions in this embodiment of this application are applicable to a scenario in which the producer is located in a NF set or a NF service set, or the producer is a NF set or a NF service set. The following embodiments are mainly described by using an example in which the producer is located in the NF set.

FIG. 2 is a schematic flowchart of a communication method according to an embodiment of this application. The communication method may include the following steps.

201: A service consumer sends a token request to an NRF, and the NRF receives the token request from the service consumer.

202: The NRF sends a token request response to the service consumer, where the token request response carries a token, and the token includes a NF set identifier or a NF service set identifier of a service producer.

203: The service consumer receives the token request response from the NRF, and sends a service request to an SCP, where the service request carries the token (the token may be generated by the NRF), and the token includes the NF set identifier or the NF service set identifier of the service producer.

204: The SCP receives the service request from the service consumer, and the SCP sends the service request to a service producer selected from a NF set or a NF service set of the service producer.

205: The SCP receives a response to the service request from the service producer, and the SCP forwards the response to the service request from the service producer to the service consumer.

A token including the NF set identifier of the service producer may be considered as a token for the NF set of the service producer, and is a token at a NF set granularity. A token including the NF service set identifier of the service producer may be considered as a token for the NF service set, and is a token at a NF service set granularity.

The token request may carry an identifier of the service consumer (the identifier of the service consumer is, for example, a NF instance identifier (NF Instance ID) of the service consumer).

The token request may further carry one or more of the following information: an identifier of the service producer, the NF set identifier of the service producer, or the NF service set identifier of the service producer.

For example, the method may further include: The NRF performs service authorization on the service consumer, and generates the token when service authorization on the service consumer succeeds.

The generating the token may include: If the token request carries the identifier of the service producer, the NRF obtains the NF set identifier of the service producer based on the identifier of the service producer, and generates a token including the NF set identifier of the service producer; or if the token request carries the NF set identifier of the service producer, the NRF generates a token including the NF set identifier of the service producer.

For example, when the service producer is a NF, an audience claim of the token includes the NF set identifier of the service producer.

Alternatively, when the service producer is a NF service, a scope claim of the token includes the NF service set identifier of the service producer.

The SCP may select the service producer from the NF set or the NF service set of the service producer according to a local policy and/or other information (for example, selection parameters carried in the service request).

For example, before the sending the service request to the service producer in the NF set represented by the NF set identifier, the method further includes: The SCP verifies the token included in the service request.

That the SCP sends the service request to the service producer in the NF set represented by the NF set identifier includes: When verification on the token succeeds, the SCP sends the service request to the service producer in the NF set represented by the NF set identifier.

For example, verification on the token may include integrity verification of the token and/or claim verification of the token.

For example, the claim verification of the token may include: verifying whether the NF set identifier of the service producer included in the audience claim of the token is consistent with a NF set identifier of the selected service producer; and when the two NF set identifiers are consistent, it indicates that audience claim verification of the token succeeds. For example, when the two NF set identifiers are inconsistent, it indicates that the audience claim verification of the token fails.

For another example, the claim verification of the token may include: verifying whether the NF service set identifier of the service producer included in the scope claim of the token is consistent with the NF service set identifier of the selected service producer; and when the two NF service set identifiers are consistent, it indicates that scope claim verification of the token succeeds. For example, when the two NF service set identifiers are inconsistent, it indicates that the scope claim verification of the token fails.

For example, the service request carries a service producer identifier or a service producer type, and the NF set identifier of the selected service producer is obtained based on the service producer identifier or the service producer type.

It can be learned that, in the foregoing solution, the NRF generates the token based on a request of the service consumer. The token includes the NF set identifier or the NF service set identifier of the service producer. In other words, the token is a token for a NF set or a NF service set to which the service producer belongs, and the token is a token at a set granularity. The use of the token at a set granularity helps implement service control based on a NF set granularity, further helps resolve a problem that different producers in a producer set verify tokens, and helps implement convenient authorization in a set scenario in an eSBA.

FIG. 3 is a schematic flowchart of another communication method according to an embodiment of this application. The another communication method may include the following steps.

301: A service consumer sends a service request to an SCP.

302: The SCP receives the service request from the service consumer; and the SCP performs service authorization on the service consumer, or the SCP requests an NRF to perform service authorization on the service consumer.

303: When service authorization on the service consumer succeeds, the SCP sends the service request to a service producer selected from a service producer set.

304: The SCP receives a response to the service request from the service producer, and the SCP forwards the response to the service request from the service producer to the service consumer.

For example, the method further includes: The SCP generates a token when service authorization on the service consumer succeeds. The service request sent by the SCP to the service producer carries the token, where the token includes a NF set identifier or a NF service set identifier of the service producer.

For example, when the service producer is a NF, an audience claim of the token includes the NF set identifier of the service producer.

Alternatively, when the service producer is a NF service, a scope claim of the token includes the NF service set identifier of the service producer.

When the service request sent by the SCP to the service producer carries the token, the service producer may perform verification on the token or request the NRF to perform verification on the token.

For example, that the SCP requests an NRF to perform service authorization on the service consumer includes:

The SCP sends an authorization request to the NRF, where the authorization request is used to request the NRF to perform service authorization on the service consumer; and the SCP receives a response to the authorization request sent by the NRF, where the response to the authorization request carries a service authorization result of the service consumer from the NRF, and the service authorization result is that service authorization succeeds or that service authorization fails.

For example, the service request carries a service identifier of a requested service, and that the SCP performs service authorization on the service consumer includes: determining, according to an authorization policy or authorization information locally configured by the SCP, whether the service consumer has permission to access the service that is represented by the service identifier and that is provided by the service producer.

It can be learned that, in the foregoing solution, the SCP generates the token. The token includes the NF set identifier or the NF service set identifier of the service producer, that is, the token is a token for a NF set or a NF service set to which the service producer belongs, and the token is a token at a set granularity. The use of the token at a set granularity helps implement service control based on a NF set granularity, further helps resolve a problem that different producers in a producer set verify tokens, and helps implement convenient authorization in a set scenario in an eSBA.

Figure 4:
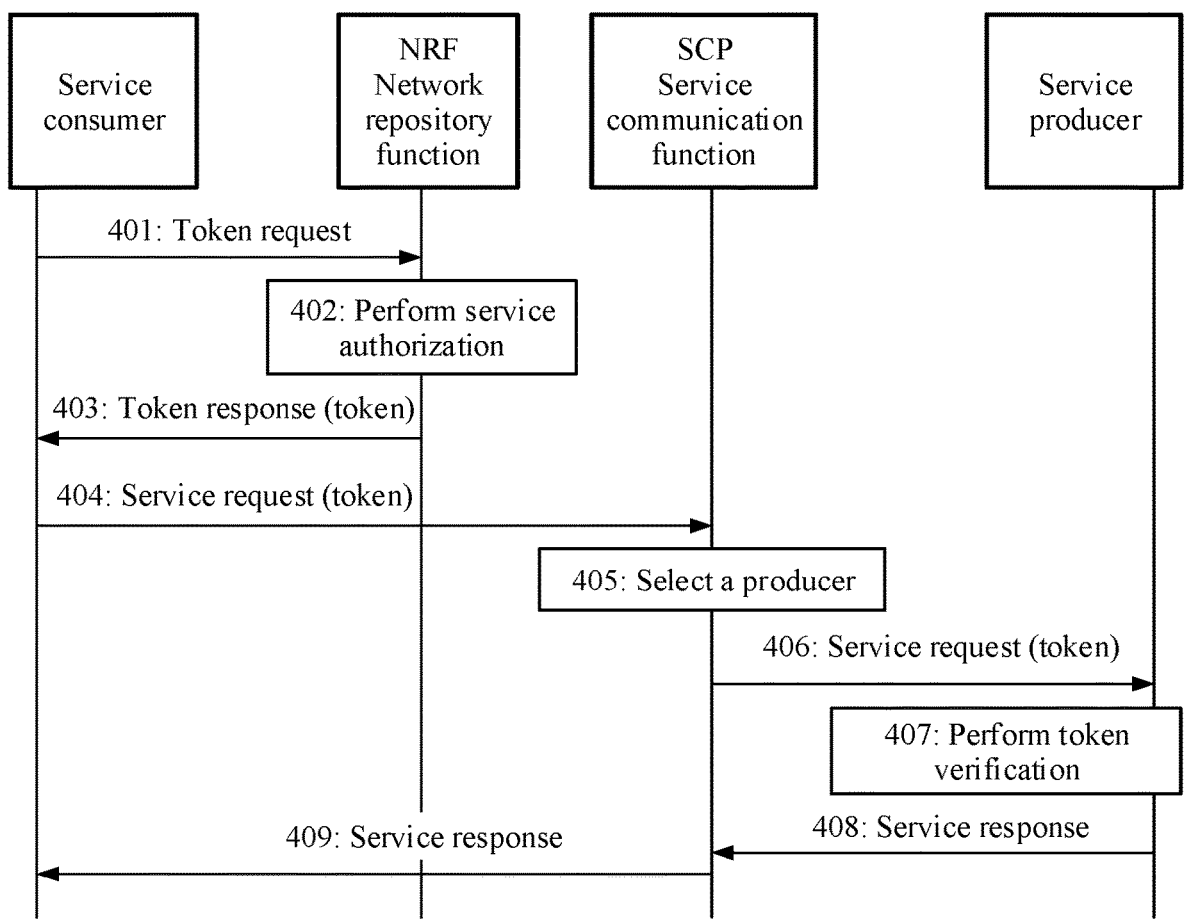

FIG. 4 is a schematic flowchart of another communication method according to an embodiment of this application. The another communication method may include the following steps.

401: A service consumer_A sends a token request to an NRF.

The service consumer_A may be, for example, a NF_A (in this case, the service consumer service consumer_A is specifically a NF).

The token request may carry an identifier of the service consumer_A (the identifier of the service consumer_A may be, for example, a NF identifier of the service consumer_A, and may be specifically, for example, a NF instance ID) and a service identifier of a requested service. A service consumer may also be referred to as a consumer for short.

A service producer in this embodiment of this application may be a NF or a NF service. To be specific, the service producer may be at a NF granularity, and the service producer may also be at a NF service granularity. A service producer may be referred to as a producer for short.

In the solution of this embodiment of this application, a service producer set includes one or more service producers.

When a service producer in the service producer set is a NF, the service producer set may also be referred to as a service producer NF set. When a service producer in the service producer set is a NF service, the service producer set may also be referred to as a service producer NF service set.

A service producer may belong to a service producer set. A service producer set may be referred to as a producer set for short, and a producer set to which a service producer belongs may also be referred to as a set to which a service producer belongs for short. To be specific, in the description of this embodiment of this application, a set to which a service producer belongs refers to a producer set to which a service producer belongs.

For example, when the service producer is a NF, a set to which the service producer belongs is a NF set, and an identifier of the NF set is a NF set ID. A NF set ID of the service producer is the NF set ID of the NF set to which the service producer belongs.

For another example, when the service producer is a NF service, a producer set to which the service producer belongs is a NF service set, where an identifier of the NF service set is a NF service set ID. A NF service set ID of the service producer is the NF service set ID of the NF service set to which the service producer belongs.

Therefore, when the service producer is a NF, the set to which the service producer belongs refers to the NF set to which the service producer belongs. The identifier of the NF set to which the service producer belongs refers to the NF set ID of the NF set to which the service producer belongs. In addition, when the service producer is a NF service, the set to which the service producer belongs refers to the NF service set to which the service producer belongs. The identifier of the NF service set to which the service producer belongs refers to the NF service set ID of the NF service set to which the service producer belongs.

The token request may also carry related information about the service producer. For example, the token request may further carry a type of a service producer and/or an identifier of the service producer_B (the identifier of the service producer_B may be, for example, a NF identifier of a service producer_B, and may be specifically, for example, a NF instance ID).

If the service producer is a NF, the identifier of the service producer_B may be the NF identifier (for example, the NF identifier is a NF instance ID) of the service producer_B. If the service producer_B is a NF service, the identifier of the service producer_B may be a NF service identifier of the service producer_B (the NF service identifier is specifically, for example, a NF service instance ID).

In some possible implementations, if the service producer belongs to a NF set (in this case, the service producer is a NF), the token request may carry the identifier (for example, the NF instance ID) of the service consumer_A and a service identifier of a requested service. In addition, the token request may further carry one or more of the following information: a NF type of the service producer_B, a NF set ID (NF set identifier) of the service producer_B, and the identifier of the service producer_B (for example, the NF instance ID of the service producer_B). The NF set ID of the service producer_B is a NF set ID of a NF set to which the service producer_B belongs.

In some other possible implementations, if the service producer_B belongs to a NF service set (in this case, the service producer_B is a NF service), the token request may carry the identifier (for example, the NF instance ID) of the service consumer_A and a service identifier of a requested service. In addition, the token request may further carry one or more of the following information: a service type of the service producer_B, the identifier of the service producer_B (for example, the NF service instance ID of the service producer_B), and a NF service set ID (NF service set ID) of the service producer_B. The NF service set ID of the service producer_B is a NF service set ID of the NF service set to which the service producer_B belongs.

402: The NRF receives the token request from the service consumer_A, and the NRF performs service authorization on the service consumer_A.

The performing service authorization on the service consumer_A may specifically include: obtaining information such as the identifier of the service consumer_A from the token request, and performing service authorization on the service consumer_A according to a locally configured authorization policy and/or authorization information.

In some possible implementations, when the service producer_B is a NF, if the token request carries the identifier of the service producer_B (but does not carry the NF set ID), after service authorization succeeds, the NRF may query the NF set ID of the NF set to which the service producer_B belongs based on the identifier of the service producer_B, and generate a token including the NF set ID of the service producer_B. Specifically, for example, an audience claim of the token may include the NF set ID of the service producer_B.

If the token request carries the NF set ID of the service producer_B, a step of querying the NF set ID of the NF set to which the service producer_B belongs based on the identifier of the service producer_B may be omitted. The token including the NF set ID of the service producer_B is generated directly. Specifically, for example, the audience claim of the token may include the NF set ID of the service producer_B.

When an audience claim of a token includes a NF set ID of a NF set to which a service producer belongs, it indicates that the token is a token at a NF set granularity, and the token may be used to access a service of each producer in the NF set to which the service producer belongs.

In some other possible implementations, when the service producer_B is a NF service, if the token request carries the identifier of the service producer (but does not carry the NF service set ID), after service authorization succeeds, the NRF may query the NF service set ID of the NF service set to which the service producer_B belongs based on the identifier of the service producer_B, and generate a token including the NF service set ID of the service producer_B. For example, a scope claim of the token may include the NF service set ID of the service producer_B.

If the token request carries the NF service set ID of the service producer_B, a step of querying the NF service set ID of the NF service set to which the service producer_B belongs based on the identifier of the service producer_B may be omitted. The token including the NF service set ID of the service producer_B is generated directly. For example, the scope claim of the token may include the NF service set ID of the service producer_B.

When a scope claim of a token includes the NF service set ID of the NF service set to which the service producer_B belongs, it indicates that the token is a token at a NF service set granularity, and the token may be used to access a service of each producer in the NF service set to which the service producer_B belongs.

403: The NRF sends a token request response carrying the token to the service consumer_A (the token request response may be referred to as a token response for short).

404: The service consumer_A receives the token request response from the NRF, and the service consumer_A sends a service request to an SCP.

The service request sent by the service consumer_A carries the token, the identifier of the service consumer_A (for example, the NF instance ID of the service consumer_A), the identifier of the service producer_B (for example, the NF instance ID or the NF service instance ID of the service producer_B), and a service identifier of a requested service.

The service request sent by the service consumer_A may further carry selection parameters.

405: The SCP receives the service request from the service consumer_A. The SCP selects a service producer_C from the producer set to which the service producer_B belongs (the service producer_C may be or may not be the same as the service producer_B).

The selecting the service producer_C from the producer set may specifically include: If the service request carries the selection parameters, the SCP may select the service producer_C from the producer set based on the selection parameters carried in the service request. In addition, if the service request does not carry the selection parameters, for example, the SCP may select the service producer_C from the producer set according to a locally configured related policy.

For example, when a service producer is a NF service, the service producer_C selected by the SCP from the producer set may be referred to as a NF service_C.

For example, when the service producer is a NF, the service producer_C selected by the SCP from the producer set may be referred to as a NF_C.

406: The SCP sends the service request carrying the token to the service producer_C.

The SCP may add, delete, and/or replace the information carried in the service request from the service consumer_A (for example, the SCP may delete the selection parameters carried in the service request), and then send the service request to the service producer_C. Certainly, the SCP may alternatively directly send the service request to the service producer_C without modifying the information carried in the service request from the service consumer_A.

407: The service producer_C receives the service request that carries the token and that is forwarded by the SCP.

The service producer_C performs verification on the token.

The verification on the token specifically includes token integrity verification and token claim verification.

The token integrity verification may include: verifying token integrity by using a public key of the NRF or a shared key of the NRF.

After the token integrity verification succeeds, the token claim verification may include token audience claim verification.

The token audience claim verification may include: verifying whether a NF set ID included in the audience claim of the token is consistent with a NF set ID of a NF set to which the service producer_C that is found based on an identifier of the service producer_C belongs. If the two IDs are consistent, the audience claim verification succeeds. If the two IDs are inconsistent, the audience claim verification fails.

After the token integrity verification succeeds, the token claim verification may include token scope claim verification.

The token scope claim verification may include: verifying whether a NF service set ID included in the scope claim of the token is consistent with a NF service set ID of a NF service set to which the service producer_C that is found based on the identifier of the service producer_C belongs. If the two IDs are consistent, the scope claim verification succeeds. If the two IDs are inconsistent, the scope claim verification fails.

In addition, the service producer_C may request the NRF to verify the token carried in the service request. For example, the service producer_C may send the token carried in the service request to the NRF, and request the NRF to verify the token. After verifying the token, the NRF returns a token verification result to the service producer_C (the result is that verification on the token succeeds or that verification on the token fails).

408: The service producer_C sends a response to the service request (for example, the response to the service request may be referred to as a service response for short) to the service consumer_A.

If verification on the token succeeds, the response may carry a service request success indication (in this case, the service producer_C agrees to provide a service for the service consumer_A).

If verification on the token fails, the response may carry a service request failure indication (in this case, the service producer_C refuses to provide a service for the service consumer_A).

409: After receiving the service response from the service producer_C, the SCP may forward the received service response to the service consumer_A.

Figure 5:
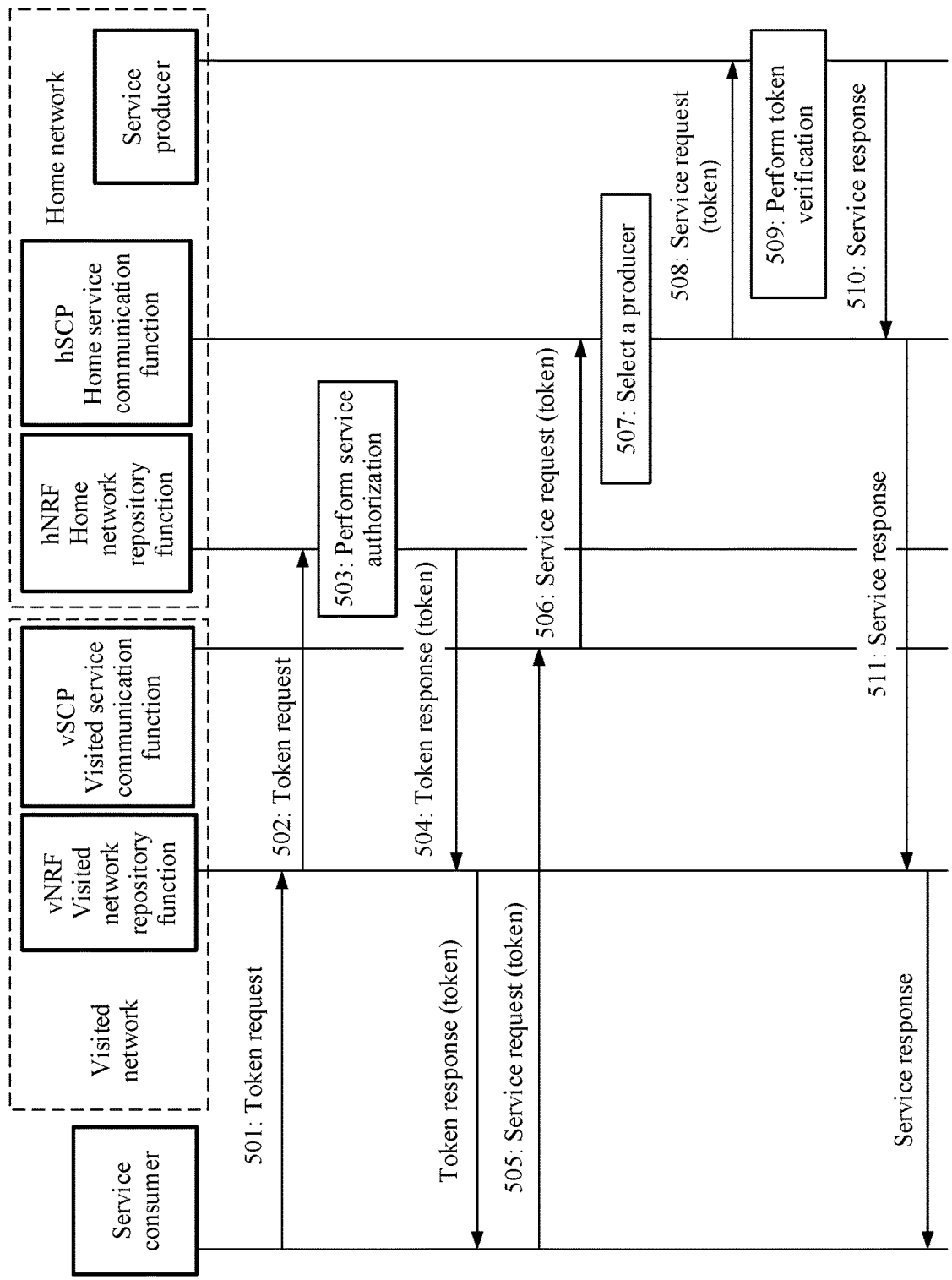

FIG. 5 is a schematic flowchart of a communication method according to an embodiment of this application. The procedure shown in FIG. 5 is a roaming scenario corresponding to the procedure in FIG. 4. The communication method may include the following steps.

501: A service consumer_A sends a token request to a vNRF (the vNRF is an NRF in a visited network).

When the service consumer_A roams to the visited network, the service consumer_A may send the token request to the vNRF (the vNRF is the NRF in the visited network).

For information carried in the token request, refer to related description in step 401. Details are not described herein again.

502: The vNRF forwards the token request from a NF_A to an hNRF (the hNRF is an NRF in a home network).

503. The hNRF receives the token request from the vNRF, and the hNRF performs service authorization on the service consumer_A and generates a token.

For a manner in which the hNRF performs service authorization on the service consumer_A and generates the token, refer to the manner in which the NRF performs service authorization on the service consumer_A and generates the token in step 402. Details are not described herein again.

504: The hNRF sends a token request response carrying the token to the NF_A through the vNRF (the token request response may be referred to as a token response for short).

505: The service consumer_A receives the token request response forwarded by the vNRF from the hNRF, and the service consumer_A sends a service request to a vSCP (the vSCP is an SCP in the visited network).

The service request sent by the service consumer_A carries the token, an identifier of the service consumer_A (for example, a NF instance ID of the service consumer_A), an identifier of a service producer_B (for example, a NF instance ID or a NF service instance ID of the service producer_B), and a service identifier of a requested service.

The service request sent by the service consumer_A may further carry selection parameters.

506: The vSCP receives the service request from the service consumer_A, and the vSCP forwards the service request from the service consumer_A to an hSCP (the hSCP is an SCP in the home network).

507: The hSCP receives the service request forwarded by the vSCP from the service consumer_A.

The hSCP selects a service producer_C from a producer set to which the service producer_B belongs (the service producer_C may be or may not be the same as the service producer_B).

The selecting the service producer_C from the producer set may specifically include: If the service request carries the selection parameters, the hSCP may select the service producer_C from the producer set based on the selection parameters carried in the service request. In addition, if the service request does not carry the selection parameters, for example, the hSCP may select the service producer_C from the producer set according to a locally configured related policy.

For example, when a service producer is a NF service, the service producer_C selected by the hSCP from the producer set may be referred to as a NF service_C.

For example, when the service producer is a NF, the service producer_C selected by the hSCP from the producer set may be referred to as a NF_C.

508: The hSCP sends the service request carrying the token to the service producer_C.

The hSCP may add, delete, and/or replace the information carried in the service request from the service consumer_A (for example, the hSCP may delete the selection parameters carried in the service request), and then send the service request to the service producer_C. Certainly, the hSCP may also directly send the service request to the service producer_C without modifying the information carried in the service request from the service consumer_A.

509: The service producer_C receives the service request that carries the token and that is forwarded by the hSCP.

The service producer_C performs verification on the token. For a specific manner of verification on the token, refer to related description in step 407. Details are not described herein again.

In addition, the service producer_C may request an NRF to verify the token carried in the service request. For example, the target service producer_C may send the token carried in the service request to the NRF, and request the NRF to verify the token. After verifying the token, the NRF returns a token verification result to the service producer_C (the result is that verification on the token succeeds or that verification on the token fails).

510: The service producer_C sends a response to the service request (for example, the response to the service request may be referred to as a service response for short) to the service consumer_A.

If verification on the token succeeds, the response may carry a service request success indication (in this case, the service producer_C agrees to provide a service for the service consumer_A).

If verification on the token fails, the response may carry a service request failure indication (in this case, the service producer_C refuses to provide a service for the service consumer_A).

511: After receiving the service response from the service producer_C, the hSCP forwards the received service response to the service consumer_A through the vSCP.

It may be understood that the token claims in this embodiment of this application further include other information, for example, may further include one or more of the following information: a service type of the provider, a service type of the consumer, S-NSSAI, a NF set ID, a service instance set ID, a service zone ID, a service area, a DNN, a TAI, a PLMN ID, location information of the target NF or NF service. Information included in the token claims in the following embodiments may also be the same, and details are not described again in the following embodiments.

In the solutions shown in FIG. 4 and FIG. 5, after service authorization, the NRF may query a NF set ID of a producer, and generate a token based on the NF set ID of the producer. After selecting the producer, the SCP sends the token to a selected producer_C (for example, a NF_C). The producer_C verifies a NF set ID of an audience claim in the token. This implements authorization based on a NF set granularity, resolves a problem that different producers in a NF set verify tokens, and implements authorization in a set scenario in an eSBA.

In the solutions shown in FIG. 4 and FIG. 5, after performing authorization according to a locally configured policy or authorization information, the NRF queries whether the producer is located in a set, and generates a token at a set granularity, where a token audience claim includes a set ID. After the token is sent to a service producer NF_C selected by the SCP along with the service request, the NF_C verifies the set ID included in the token audience claim.

Figure 6:
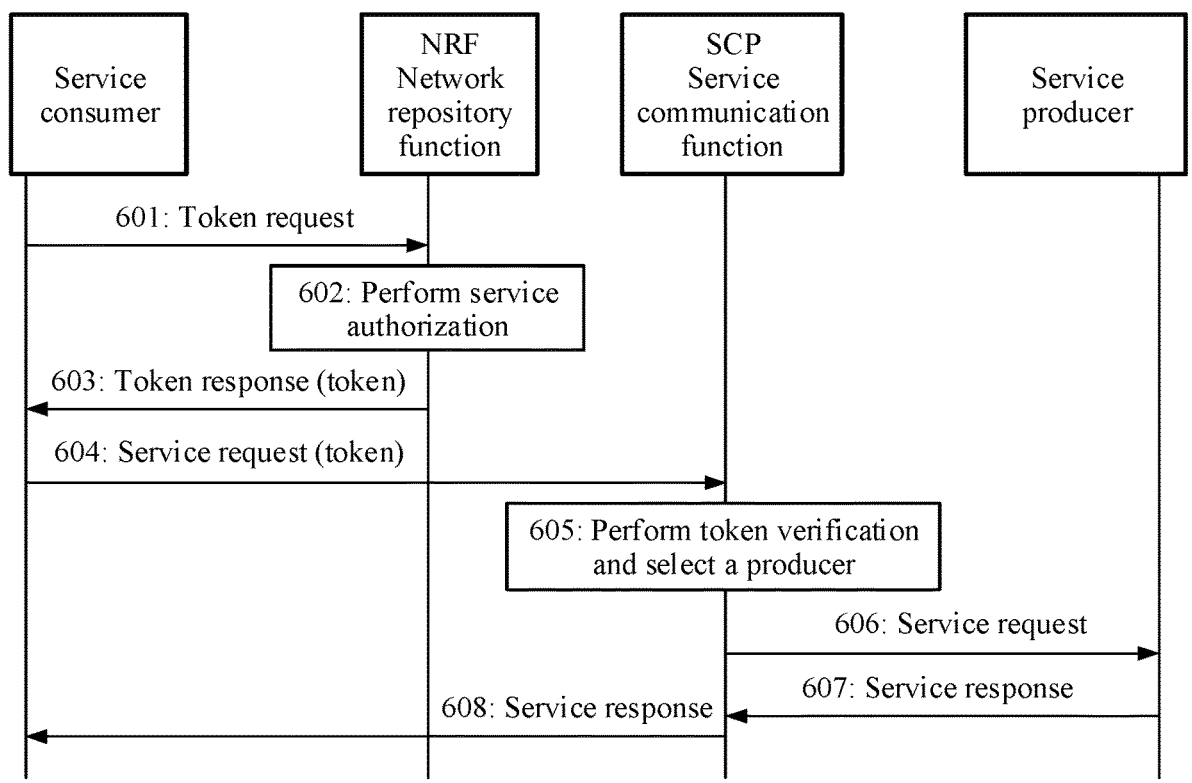

FIG. 6 is a schematic flowchart of another communication method according to an embodiment of this application. In the solution shown in FIG. 6, an SCP (or an NRF) may perform verification on a token.

As shown in FIG. 6, the communication method may include the following steps.

601: A service consumer_A sends a token request to an NRF.

602: The NRF receives the token request from the service consumer_A, and the NRF performs service authorization on the service consumer_A and generates a token.

603: The NRF sends a token request response carrying the token to the service consumer_A (the token request response may be referred to as a token response for short).

604: The service consumer_A receives the token request response from the NRF, and the service consumer_A sends a service request to an SCP.

For related detailed description of steps 601 to 604, refer to related detailed description of steps 401 to 404. Details are not described herein again.

605: The SCP receives the service request from the service consumer_A.

The SCP performs verification on the token. The verification on the token specifically includes token integrity verification and token claim verification.

The token integrity verification may include: verifying token integrity by using a public key of the NRF or a shared key of the NRF.

After the token integrity verification succeeds, the token claim verification may include token audience claim verification.

The token audience claim verification may include: verifying whether a NF set ID included in an audience claim of the token is consistent with a NF set ID of a NF set to which a service producer_C that is found based on an identifier of the service producer_C belongs. If the two IDs are consistent, the audience claim verification succeeds. If the two IDs are inconsistent, the audience claim verification fails.

After the token integrity verification succeeds, the token claim verification may include token scope claim verification.

The token scope claim verification may include: verifying whether a NF service set ID included in a scope claim of the token is consistent with a NF service set ID of a NF service set to which the service producer_C that is found based on the identifier of the service producer_C belongs. If the two IDs are consistent, the scope claim verification succeeds. If the two IDs are inconsistent, the scope claim verification fails.

In addition, the SCP may further request the NRF to verify the token carried in the service request. For example, the SCP may send the token carried in the service request to the NRF, and request the NRF to verify the token. After verifying the token, the NRF returns a token verification result to the SCP (the result is that verification on the token succeeds or that verification on the token fails).

If verification on the token succeeds (the SCP performs verification on the token to obtain the token verification result, or the SCP requests the NRF to perform verification on the token and obtains the token verification result based on corresponding feedback from the NRF), the SCP selects the service producer_C from a producer set to which a service producer_B belongs (the service producer_C may be or may not be the same as the service producer_B).

The selecting the service producer_C from the producer set may specifically include: If the service request carries selection parameters, the SCP may select the service producer_C from the producer set based on the selection parameters carried in the service request. In addition, if the service request does not carry the selection parameters, for example, the SCP may select the service producer_C from the producer set according to a locally configured related policy.

For example, when a service producer is a NF service, the service producer_C selected by the SCP from the producer set may be referred to as a NF service_C.

For example, when the service producer is a NF, the service producer_C selected by the SCP from the producer set may be referred to as a NF_C.

In addition, if verification on the token fails, the SCP may send a response to the service request to a consumer_A, where the response may carry a service request failure indication (in this case, the service producer_C refuses to provide a service for the consumer_A). In this case, the service request failure indication may specifically indicate that a failure cause is that verification on the token fails.

606: The SCP sends the service request (the service request may carry or not carry the token) to the service producer_C.

The SCP may add, delete, and/or replace information carried in the service request from the service consumer_A (for example, the SCP may delete the selection parameters carried in the service request), and then forward the service request to the NF_C. Certainly, the SCP may also directly forward the service request to the service producer_C without modifying the information carried in the service request from the service consumer_A.

607: The service producer_C receives the service request forwarded by the SCP. The service producer_C sends the response to the service request (for example, the response to the service request may be referred to as a service response for short) to the service consumer_A.

The response may carry a service request success indication (in this case, the service producer_C agrees to provide a service for the service consumer_A), or the response may carry a service request failure indication (in this case, the service producer_C refuses to provide a service for the service consumer_A).

608: After receiving the service response from the service producer_C, the SCP may forward the received service response to the service consumer_A.

In the solution of this embodiment, the SCP performs verification on the token (or the SCP entrusts token verification to a third party (for example, the NRF)), but the NF_C does not perform verification on the token. In this scenario, the NF_C trusts the SCP, that is, the SCP is a trusted SCP of the NF_C. A mechanism for establishing trust between the NF_C and the SCP is not described herein again.

In this embodiment, verification on the token is completed on the SCP, and the SCP determines, based on the token verification result, whether to select a producer and forward the service request. This helps further simplify a process.

Figure 7:
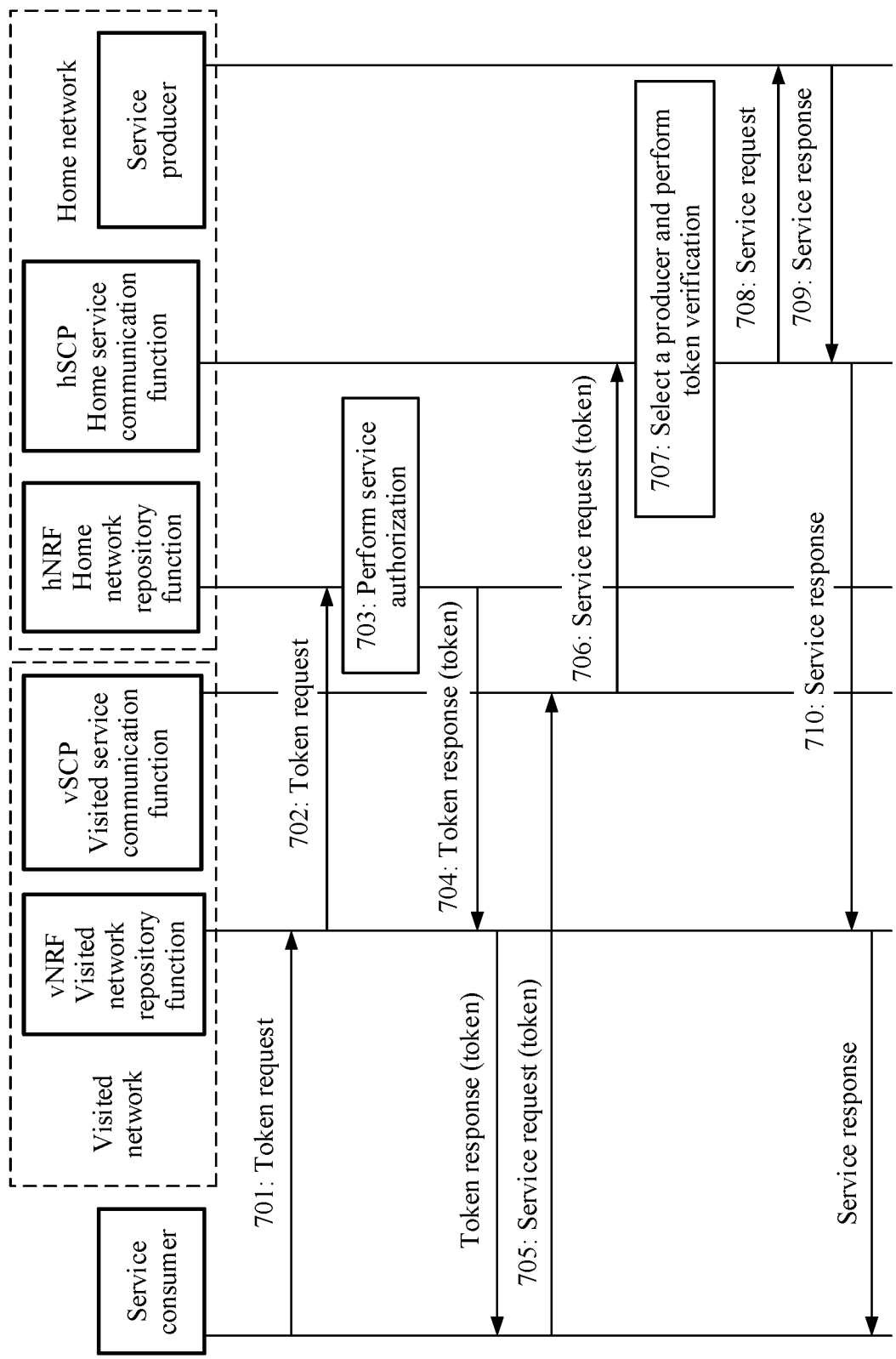

FIG. 7 is a schematic flowchart of a communication method according to an embodiment of this application. The procedure shown in FIG. 7 is a roaming scenario corresponding to the procedure in FIG. 6. The communication method may include the following steps.

As shown in FIG. 7, the communication method may include the following steps.

701: A service consumer_A sends a token request to a vNRF.

702: The vNRF receives the token request from the service consumer_A, and forwards the token request to an hNRF.

703: The hNRF receives the token request forwarded by the vNRF from the service consumer_A, and the hNRF performs service authorization and generates a token.

704: The hNRF sends a token request response carrying the token to the service consumer_A through the vNRF (the token request response may be referred to as a token response for short).

705: The service consumer_A receives the token request response forwarded by the vNRF from the hNRF, and the service consumer_A sends a service request carrying the token to a vSCP.

706: The vSCP receives the service request carrying the token from the service consumer_A, and the vSCP forwards the service request carrying the token from the service consumer_A to an hSCP.

707: The hSCP receives the service request carrying the token forwarded by the vSCP from the service consumer_A.

The hSCP performs verification on the token. The verification on the token specifically includes token integrity verification and token claim verification.

If the verification on the token succeeds (an SCP performs verification on the token to obtain a token verification result, or the SCP requests an NRF to perform verification on the token and obtains the token verification result based on corresponding feedback from the NRF), the SCP selects a service producer_C from a producer set to which a service producer_B belongs (the service producer_C may be or may not be the same as the service producer_B).

The selecting the service producer_C from the producer set may specifically include:

If the service request carries selection parameters, the SCP may select the service producer_C from the producer set based on the selection parameters carried in the service request. In addition, if the service request does not carry the selection parameters, for example, the SCP may select the service producer_C from the producer set according to a locally configured related policy.

For example, when a service producer is a NF service, the service producer_C selected by the SCP from the producer set may be referred to as a NF service_C.

For example, when the service producer is a NF, the service producer_C selected by the SCP from the producer set may be referred to as a NF_C.

In addition, if verification on the token fails, the SCP may send a response to the service request to a consumer_A, where the response may carry a service request failure indication (in this case, the service producer_C refuses to provide a service for the consumer_A). In this case, the service request failure indication may specifically indicate that a failure cause is that verification on the token fails.

708: The hSCP forwards the service request (the service request may carry or not carry the token) to the service producer_C.

709: The service producer_C receives the service request forwarded by the hSCP. The service producer_C may send a response to the service request (for example, the response to the service request may be referred to as a service response for short) to the service consumer_A through the hSCP and the vSCP.

The response may carry a service request success indication (in this case, the service producer_C agrees to provide a service for the service consumer_A), or the response may carry a service request failure indication (in this case, the service producer_C refuses to provide a service for the service consumer_A).

710: After receiving the service response from the service producer_C, the hSCP forwards the received service response to the service consumer_A through the vSCP.

In the solution of this embodiment, the hSCP performs verification on the token (or the hSCP entrusts token verification to a third party (for example, an hNRF)), but the NF_C does not perform verification on the token. In this scenario, the NF_C trusts the SCP, that is, the SCP is a trusted SCP of the NF_C. A mechanism for establishing trust between the NF_C and the SCP is not described herein again.

In this embodiment, verification on the token is completed on the SCP, and the SCP determines, based on the token verification result, whether to select a producer and forward the service request. This helps further simplify a process.

Figure 8:
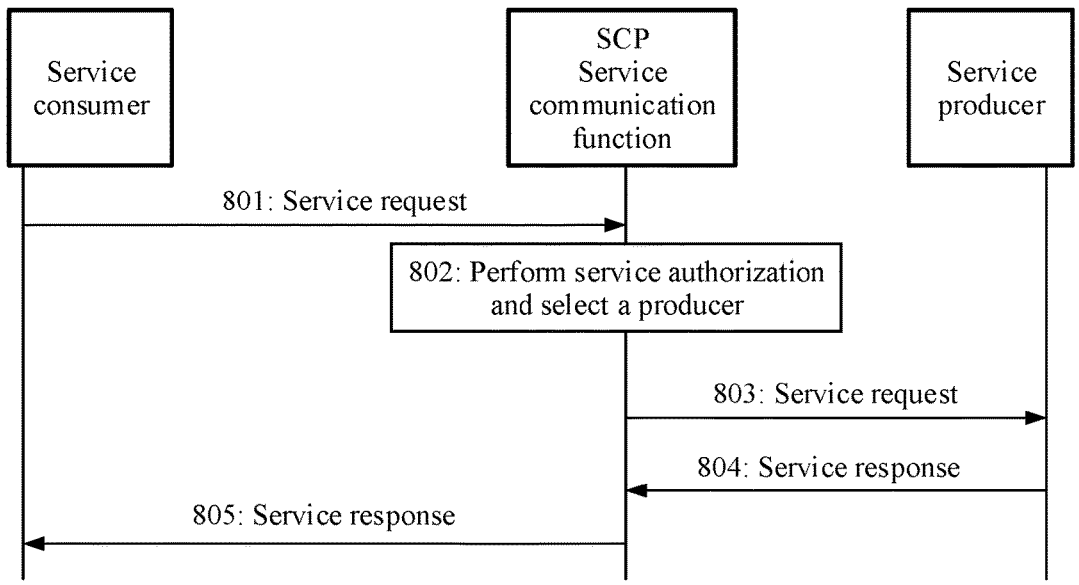

FIG. 8 is a schematic flowchart of another communication method according to an embodiment of this application. The communication method may include the following steps.

801: A service consumer_A sends a service request to an SCP.

The service request sent by the service consumer_A carries an identifier of the service consumer_A (for example, a NF instance ID of the service consumer_A), an identifier of a service producer_B (for example, a NF instance ID or a NF service instance ID of the service producer_B), and a service identifier of a requested service.

The service request sent by the service consumer_A may further carry selection parameters.

802: The SCP receives the service request from the service consumer_A, and the SCP performs service authorization on the service consumer_A.

The performing service authorization on the service consumer_A may specifically include: obtaining information such as the identifier of the service consumer_A from a token request, and performing service authorization on the service consumer_A according to a locally configured authorization policy and/or authorization information.

The SCP selects a service producer_C from a producer set to which the service producer_B belongs (the service producer_C may be or may not be the same as the service producer_B).

The selecting the service producer_C from the producer set may specifically include: If the service request carries the selection parameters, the SCP may select the service producer_C from the producer set based on the selection parameters carried in the service request. In addition, if the service request does not carry the selection parameters, for example, the SCP may select the service producer_C from the producer set according to a locally configured related policy.

For example, when a service producer is a NF service, the service producer_C selected by the SCP from the producer set may be referred to as a NF service_C.

For example, when the service producer is a NF, the service producer_C selected by the SCP from the producer set may be referred to as a NF_C.

803: The SCP forwards the service request to the service producer_C.

804: The service producer_C receives the service request forwarded by the SCP. The service producer_C sends a response to the service request (for example, the response to the service request may be referred to as a service response for short) to the service consumer_A.

The response may carry a service request success indication (in this case, the service producer_C agrees to provide a service for the service consumer_A), or the response may carry a service request failure indication (in this case, the service producer_C refuses to provide a service for the service consumer_A).

805: After receiving the service response from the service producer_C, the SCP may forward the received service response to the service consumer_A.

In this embodiment, the service producer_C trusts the SCP. Therefore, service authorization performed by the SCP is considered trustworthy.

Figure 9:
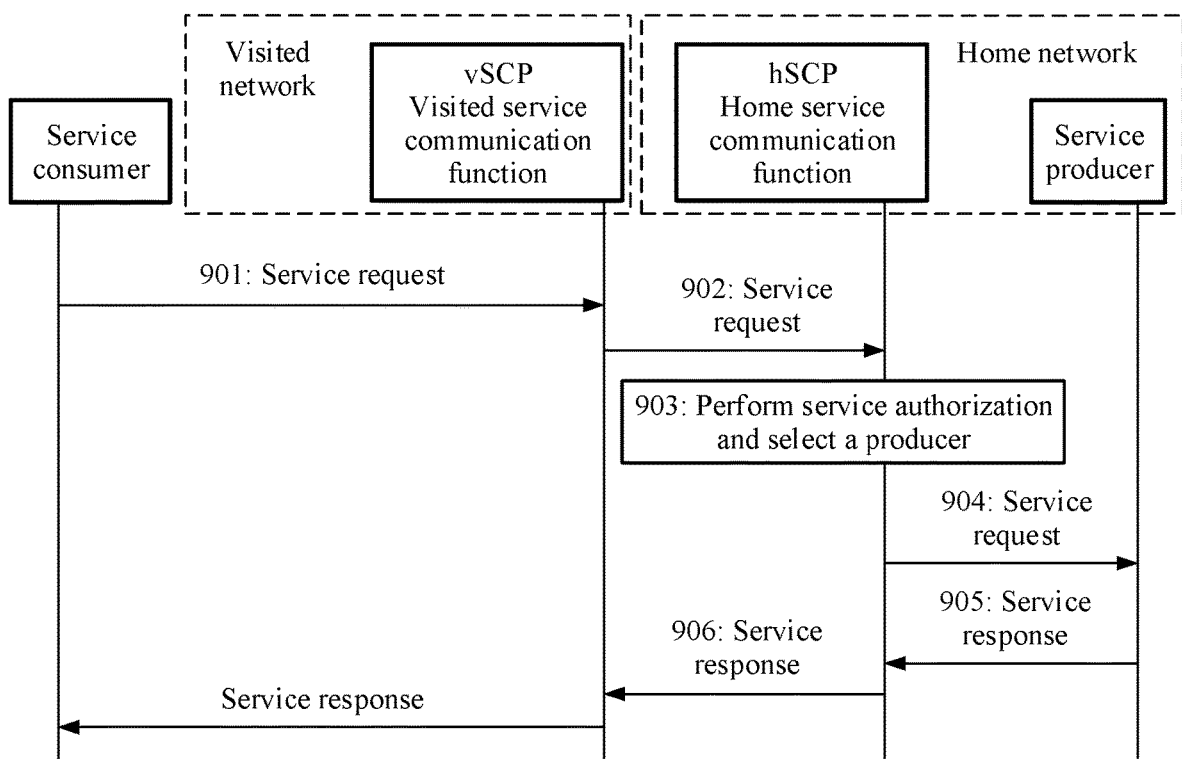

FIG. 9 is a schematic flowchart of another communication method according to an embodiment of this application. The procedure shown in FIG. 9 is a roaming scenario corresponding to the procedure in FIG. 8. The communication method may include the following steps.

901: A service consumer_A sends a service request to a vSCP.

The service request sent by the service consumer_A carries an identifier of the service consumer_A (for example, a NF instance ID of the service consumer_A), an identifier of a service producer_B (for example, a NF instance ID or a NF service instance ID of the service producer_B), and a service identifier of a requested service.

The service request sent by the service consumer_A may further carry selection parameters.

902: The vSCP receives the service request from the service consumer_A, and the vSCP forwards the service request from the service consumer_A to an hSCP.

903: The hSCP receives the service request forwarded by the vSCP from the service consumer_A, and the hSCP performs service authorization.

The performing service authorization on the service consumer_A may specifically include: obtaining information such as the identifier of the service consumer_A from a token request, and performing service authorization on the service consumer_A according to a locally configured authorization policy and/or authorization information.

The hSCP selects a service producer_C from a producer set to which the service producer_B belongs (the service producer_C may be or may not be the same as the service producer_B).

The selecting the service producer_C from the producer set may specifically include: If the service request carries the selection parameters, the hSCP may select the service producer_C from the producer set based on the selection parameters carried in the service request. In addition, if the service request does not carry the selection parameters, for example, the hSCP may select the service producer_C from the producer set according to a locally configured related policy.

For example, when a service producer is a NF service, the service producer_C selected by the hSCP from the producer set may be referred to as a NF service_C.

For example, when the service producer is a NF, the service producer_C selected by the hSCP from the producer set may be referred to as a NF_C.

904: The hSCP forwards the service request to the service producer_C.

905: The service producer_C receives the service request forwarded by the hSCP.

906: The service producer_C sends a response to the service request (for example, the response to the service request may be referred to as a service response for short) to the service consumer_A through the hSCP and the vSCP.

The response may carry a service request success indication (in this case, the service producer_C agrees to provide a service for the service consumer_A), or the response may carry a service request failure indication (in this case, the service producer_C refuses to provide a service for the service consumer_A).

907: After receiving the service response from the service producer_C, the hSCP forwards the received service response to the service consumer_A through the vSCP.

Figure 10:
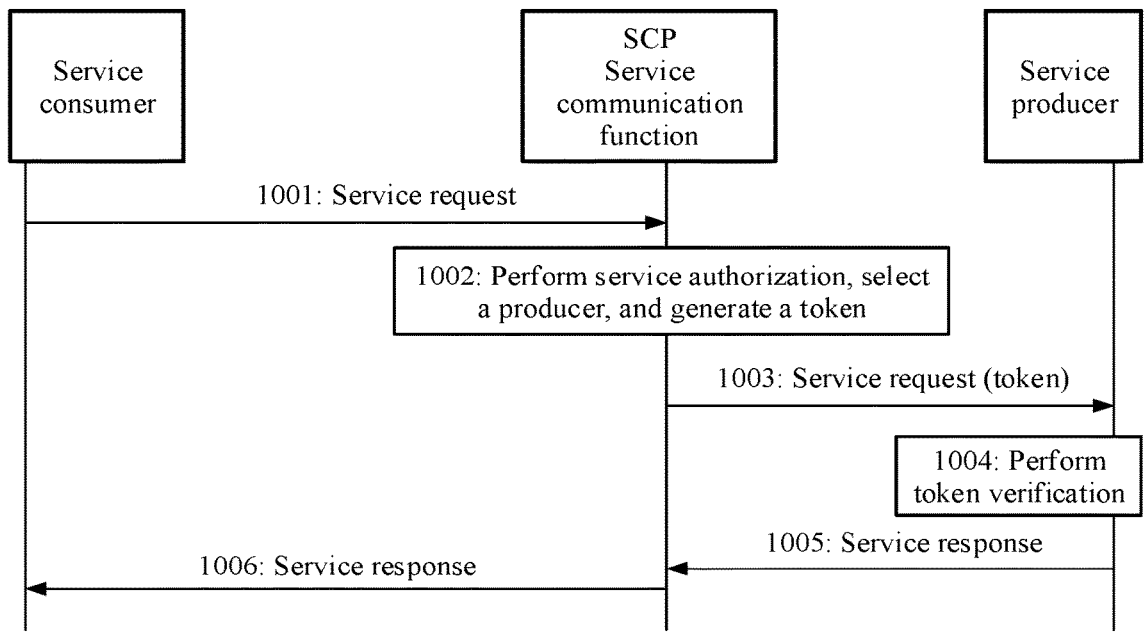

FIG. 10 is a schematic flowchart of another communication method according to an embodiment of this application. The communication method may include the following steps.

1001: A service consumer_A sends a service request to an SCP.

The service request sent by the service consumer_A carries an identifier of the service consumer_A (for example, a NF instance ID of the service consumer_A), an identifier of a service producer_B (for example, a NF instance ID or a NF service instance ID of the service producer_B), and a service identifier of a requested service.

The service request sent by the service consumer_A may further carry selection parameters.

1002: The SCP receives the service request from the service consumer_A, and the SCP performs service authorization on the service consumer_A and generates a token.

The performing service authorization on the service consumer_A may specifically include: obtaining information such as the identifier of the service consumer_A from a token request, and performing service authorization on the service consumer_A according to a locally configured authorization policy and/or authorization information.

For a specific manner in which the SCP generates the token, refer to a manner in which an NRF generates a token. Details are not described herein again.

The SCP selects a service producer_C from a producer set to which the service producer_B belongs (the service producer_C may be or may not be the same as the service producer_B).

The selecting the service producer_C from the producer set may specifically include: If the service request carries the selection parameters, the SCP may select the service producer_C from the producer set based on the selection parameters carried in the service request. In addition, if the service request does not carry the selection parameters, for example, the SCP may select the service producer_C from the producer set according to a locally configured related policy.

For example, when a service producer is a NF service, the service producer_C selected by the SCP from the producer set may be referred to as a NF service_C.

For example, when the service producer is a NF, the service producer_C selected by the SCP from the producer set may be referred to as a NF_C.

In addition, if service authorization fails, the SCP may send a response to the service request to the service consumer_A, where the response may carry a service request failure indication (in this case, the service producer_C refuses to provide a service for the service consumer_A). In this case, the service request failure indication may specifically indicate that a failure cause is that service authorization fails.

1003: The SCP forwards the service request carrying the token to the service producer_C.

The SCP may add, delete, and/or replace information (for example, the token) carried in the service request from the service consumer_A (for example, the SCP may delete the selection parameters carried in the service request), and then forward the service request to the service producer_C.

1004: The service producer_C receives the service request that carries the token and that is forwarded by the SCP.

The service producer_C performs verification on the token.

For a specific manner in which the service producer_C performs verification on the token, refer to related description in the embodiment shown in FIG. 4. Details are not described herein again.

In addition, the service producer_C may request an NRF to verify the token carried in the service request. For example, the service producer_C may send the token carried in the service request to the NRF, and request the NRF to verify the token. After verifying the token, the NRF returns a token verification result to the service producer_C (the result is that verification on the token succeeds or that verification on the token fails).

1005: The service producer_C sends the response to the service request (for example, the response to the service request may be referred to as a service response for short) to the service consumer_A.

If verification on the token succeeds, the response may carry a service request success indication (in this case, the service producer_C agrees to provide a service for the service consumer_A).

If verification on the token fails, the response may carry a service request failure indication (in this case, the service producer_C refuses to provide a service for the service consumer_A).

1006: After receiving the service response from the service producer_C, the SCP may forward the received service response to the service consumer_A.

Figure 11:
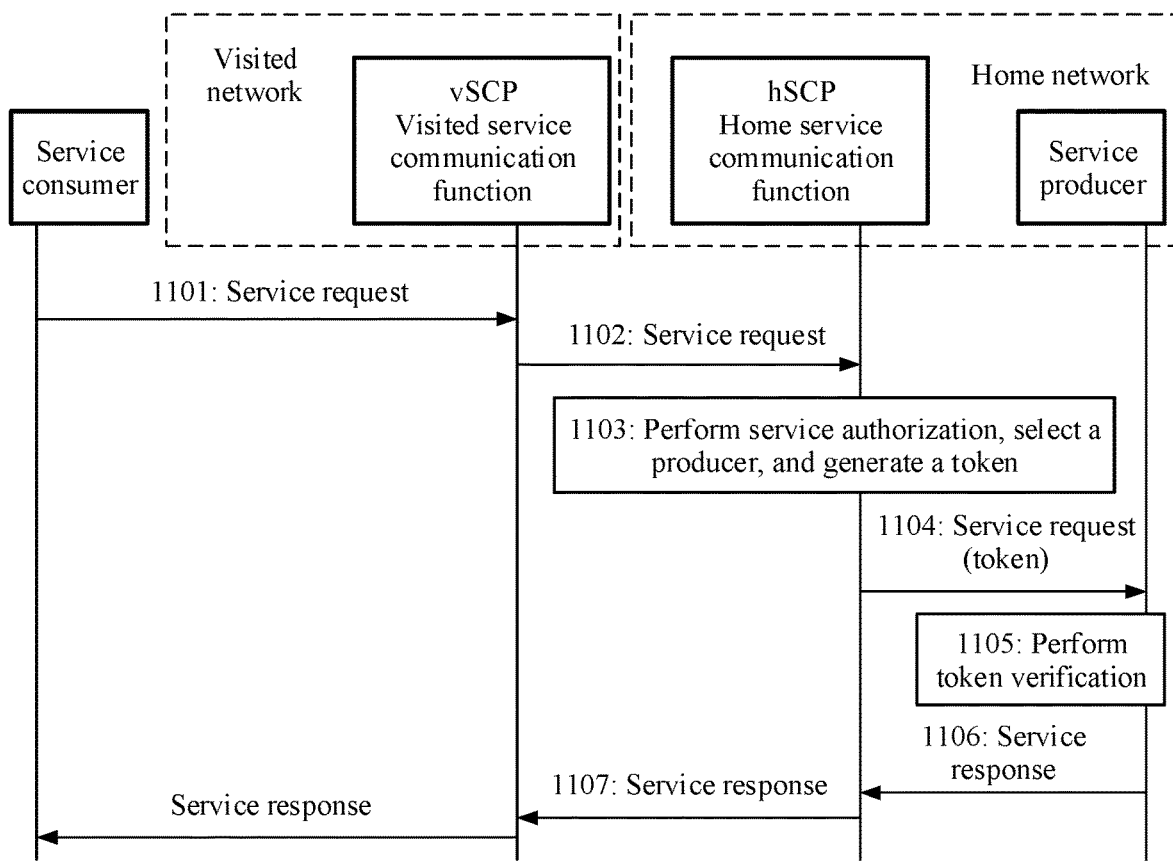

FIG. 11 is a schematic flowchart of another communication method according to an embodiment of this application. The procedure shown in FIG. 11 is a roaming scenario corresponding to the procedure in FIG. 10. The communication method may include the following steps.

1101: A service consumer_A sends a service request to a vSCP.

The service request sent by the service consumer_A carries an identifier of the service consumer_A (for example, a NF instance ID of the service consumer_A), an identifier of a service producer_B (for example, a NF instance ID or a NF service instance ID of the service producer_B), and a service identifier of a requested service.

The service request sent by the service consumer_A may further carry selection parameters.

1102: The vSCP receives the service request from the service consumer_A, and the vSCP forwards the service request from the service consumer_A to an hSCP.

1103: The hSCP receives the service request forwarded by the vSCP from the service consumer_A, and the hSCP performs service authorization and generates a token.

The performing service authorization on the service consumer_A may specifically include: obtaining information such as the identifier of the service consumer_A from a token request, and performing service authorization on the service consumer_A according to a locally configured authorization policy and/or authorization information.

For a specific manner in which the hSCP generates the token, refer to a manner in which an NRF generates a token. Details are not described herein again.

The hSCP selects a service producer_C from a producer set to which the service producer_B belongs (the service producer_C may be or may not be the same as the service producer_B).

The selecting the service producer_C from the producer set may specifically include: If the service request carries the selection parameters, the hSCP may select the service producer_C from the producer set based on the selection parameters carried in the service request. In addition, if the service request does not carry the selection parameters, for example, the hSCP may select the service producer_C from the producer set according to a locally configured related policy.

For example, when a service producer is a NF service, the service producer_C selected by the hSCP from the producer set may be referred to as a NF service_C.

For example, when the service producer is a NF, the service producer_C selected by the hSCP from the producer set may be referred to as a NF_C.

In addition, if service authorization fails, the hSCP may send a response to the service request to the service consumer_A, where the response may carry a service request failure indication (in this case, the service producer_C refuses to provide a service for the service consumer_A). In this case, the service request failure indication may specifically indicate that a failure cause is that service authorization fails.

1104: The hSCP forwards the service request carrying the token to the service producer_C.

The hSCP may add, delete, and/or replace information (for example, the token) carried in the service request from the service consumer_A (for example, the hSC may delete the selection parameters carried in the service request), and then forward the service request to the service producer_C.

1105: The service producer_C receives the service request that carries the token and that is forwarded by the hSCP. The service producer_C performs verification on the token.

The service producer_C performs verification on the token.

For a specific manner in which the service producer_C performs verification on the token, refer to related description in the embodiment shown in FIG. 4. Details are not described herein again.

In addition, the service producer_C may request an NRF to verify the token carried in the service request. For example, the service producer_C may send the token carried in the service request to the NRF, and request the NRF to verify the token. After verifying the token, the NRF returns a token verification result to the service producer_C (the result is that verification on the token succeeds or that verification on the token fails).

1006: The service producer_C sends the response to the service request (for example, the response to the service request may be referred to as a service response for short) to the service consumer_A.

If verification on the token succeeds, the response may carry a service request success indication (in this case, the service producer_C agrees to provide a service for the service consumer_A).

If verification on the token fails, the response may carry a service request failure indication (in this case, the service producer_C refuses to provide a service for the service consumer_A).

1107: After receiving the service response from the service producer_C, the hSCP forwards the received service response to the service consumer_A through the vSCP.

It can be learned that, in solutions of some embodiments of this application, the NRF or the SCP may perform service authorization, or the NRF or the SCP may perform token generation, and a generated token may be at a set granularity. This can implement authorization in an indirect mode in which the SCP participates in an eSBA architecture when a producer is located in a NF/NF service set, or when a producer is a NF/NF service set. In this case, a consumer can use authorization information of another instance in a same set as the producer to access services of the producer. In addition, authorization in a roaming scenario can be implemented in the foregoing interactive mode.

The following further provides related device embodiments.

Figure 12:
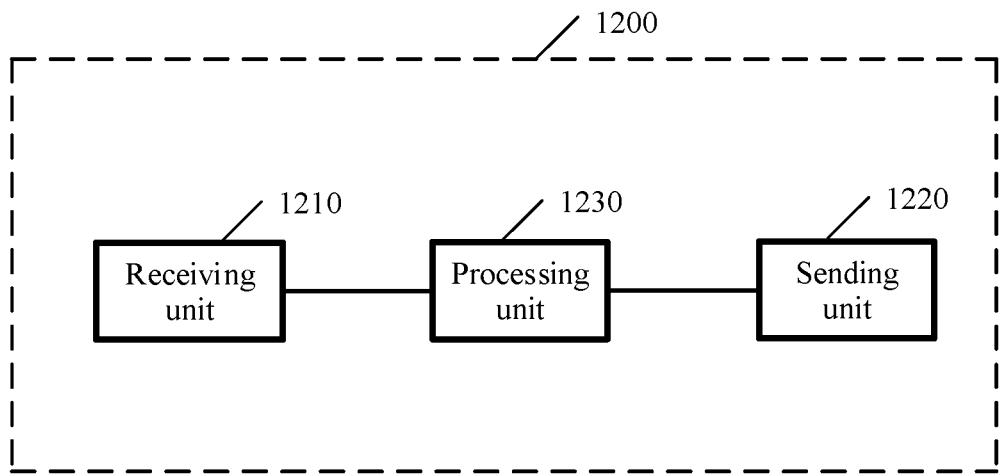
FIG. 12 and FIG. 13 are schematic diagrams of architectures of two network repository functions according to an embodiment of this application.

Refer to FIG. 12. An embodiment of this application further provides a network repository function (NRF) 1200, including:

a receiving unit 1210, configured to receive a token request from a service consumer; and a sending unit 1220, configured to send a token request response to the service consumer, where the token request response carries a token, and the token includes a NF set identifier of a service producer.

For example, the token request carries one or more of the following information: an identifier of the service producer, or the NF set identifier of the service producer.

For example, the NRF may further include a processing unit 1230. The processing unit is configured to: if the token request carries the identifier of the service producer, obtain the NF set identifier of the service producer based on the identifier of the service producer, and generate a token including the NF set identifier of the service producer; or if the token request carries the NF set identifier of the service producer, generate a token including the NF set identifier of the service producer.

For example, when the service producer is a NF, an audience claim of the token includes the NF set identifier of the service producer.

Alternatively, when the service producer is a NF service, a scope claim of the token includes a NF service set identifier of the service producer.

Figure 13:
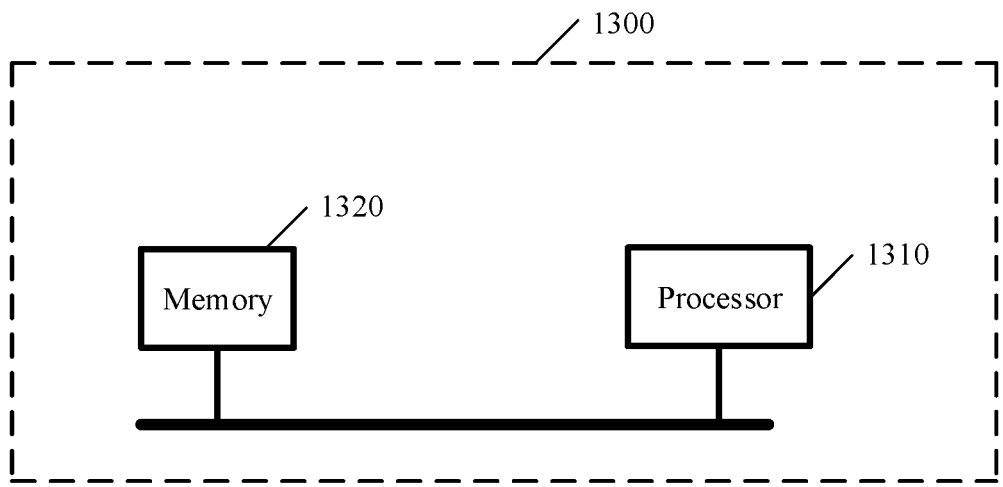

Refer to FIG. 13. An embodiment of this application further provides an NRF, including:

a processor 1310 and a memory 1320 that are coupled to each other. The processor invokes a program stored in the memory, to perform the following steps: receiving a token request from a service consumer; and sending a token request response to the service consumer, where the token request response carries a token, and the token includes a NF set identifier or a NF service set identifier of a service producer.

Figure 14:
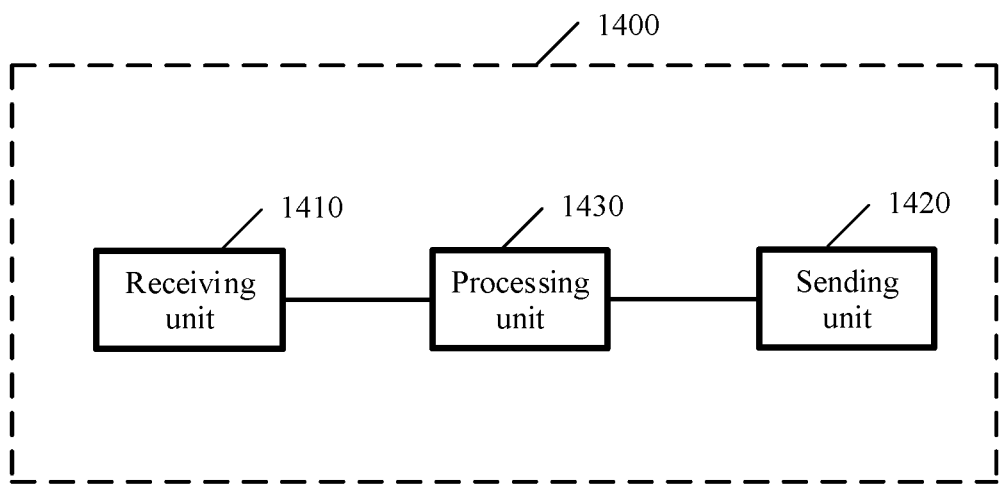
FIG. 14 and FIG. 15 are schematic diagrams of architectures of two SCPs according to an embodiment of this application.

Refer to FIG. 14. An embodiment of this application further provides an SCP 1400, including:

a receiving unit 1410, configured to receive a service request from a service consumer, where the service request carries a token (this token may be generated by an NRF), and the token includes a NF set identifier or a NF service set identifier of a service producer; and a sending unit 1420, configured to send the service request to a service producer selected from a NF set or a NF service set of the service producer.

For example, when the service producer is a NF, an audience claim of the token includes the NF set identifier of the service producer.

Alternatively, when the service producer is a NF service, a scope claim of the token includes the NF service set identifier of the service producer.

The service producer may be selected according to a local policy and/or other information (for example, selection parameters carried in the service request) from the NF set or the NF service set of the service producer.

For example, the SCP further includes a processing unit 1430, configured to verify the token included in the service request before sending the service request to the service producer in the NF set represented by the NF set identifier.

The sending unit is specifically configured to send the service request to a service producer in the NF set represented by the NF set identifier when verification on the token succeeds.

Figure 15:
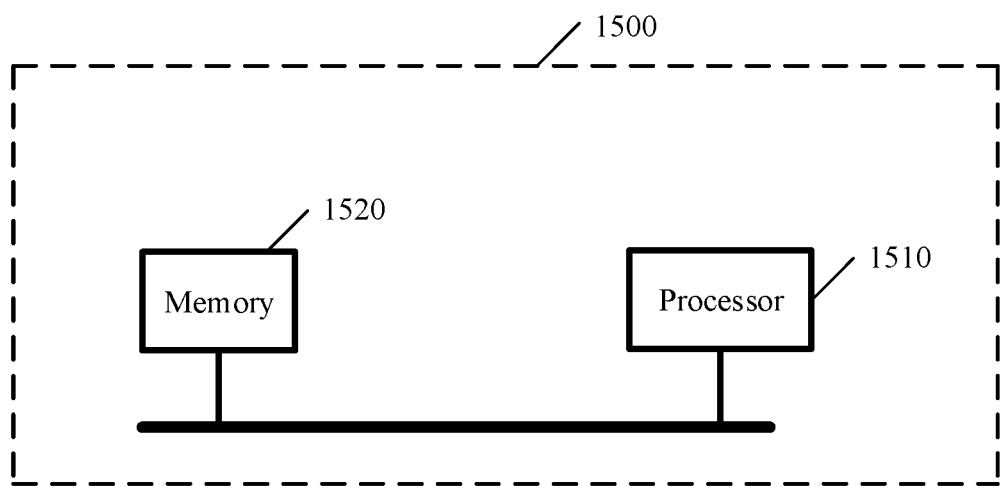

Refer to FIG. 15. An embodiment of this application further provides an SCP 1500, including:

a processor 1510 and a memory 1520 that are coupled to each other. The processor 1510 is configured to invoke a program stored in the memory 1520, to perform the following steps:

receiving a service request from a service consumer, where the service request carries a token (this token may be generated by an NRF), and the token includes a NF set identifier or a NF service set identifier of a service producer; and sending the service request to a service producer selected from a NF set or a NF service set of the service producer.

Figure 16:
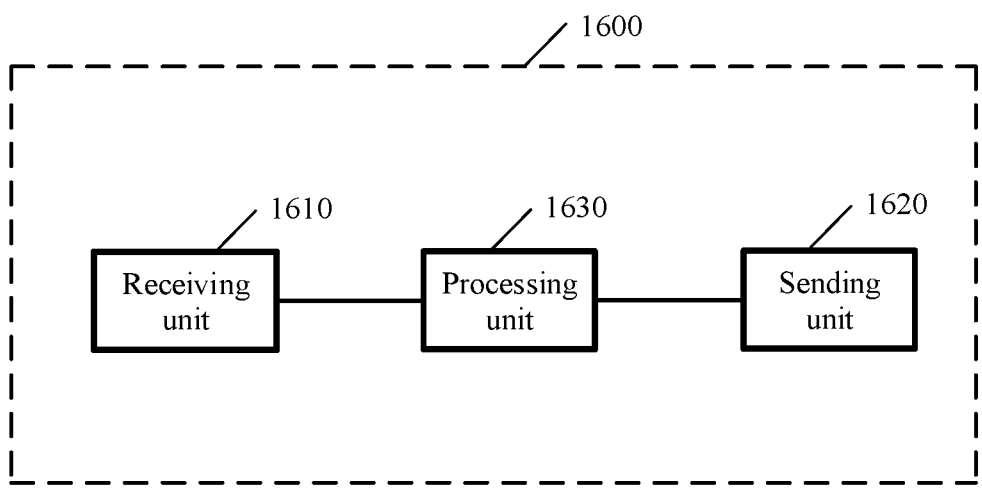
FIG. 16 and FIG. 17 are schematic diagrams of architectures of two service producers according to an embodiment of this application.

Refer to FIG. 16. An embodiment of this application further provides a service producer 1600, including: a receiving unit 1610, configured to receive a service request sent by a service communication proxy (SCP), where the service request carries a token, and the token includes a NF set identifier of the service producer;

a processing unit 1630, configured to verify the token; and a sending unit 1620, configured to send a response to the service request.

For example, when the service producer is a NF, an audience claim of the token includes the NF set identifier of the service producer.

Alternatively, when the service producer is a NF service, a scope claim of the token includes a NF service set identifier of the service producer.

For example, verification on the token may include integrity verification of the token and/or claim verification of the token.

For example, the claim verification of the token may include: verifying whether the NF set identifier of the service producer included in the audience claim of the token is consistent with a NF set identifier of the selected service producer; and when the two NF set identifiers are consistent, it indicates that audience claim verification of the token succeeds. For example, when the two NF set identifiers are inconsistent, it indicates that the audience claim verification of the token fails.

For another example, the claim verification of the token may include: verifying whether the NF service set identifier of the service producer included in the scope claim of the token is consistent with a NF service set identifier of the selected service producer; and when the two NF service set identifiers are consistent, it indicates that scope claim verification of the token succeeds. For example, when the two NF service set identifiers are inconsistent, it indicates that the scope claim verification of the token fails.

For example, when verification on the token succeeds, the response to the service request sent by the service producer may carry a token verification success indication. When verification on the token fails, the response to the service request sent by the service producer may carry a token verification failure indication.

Figure 17:
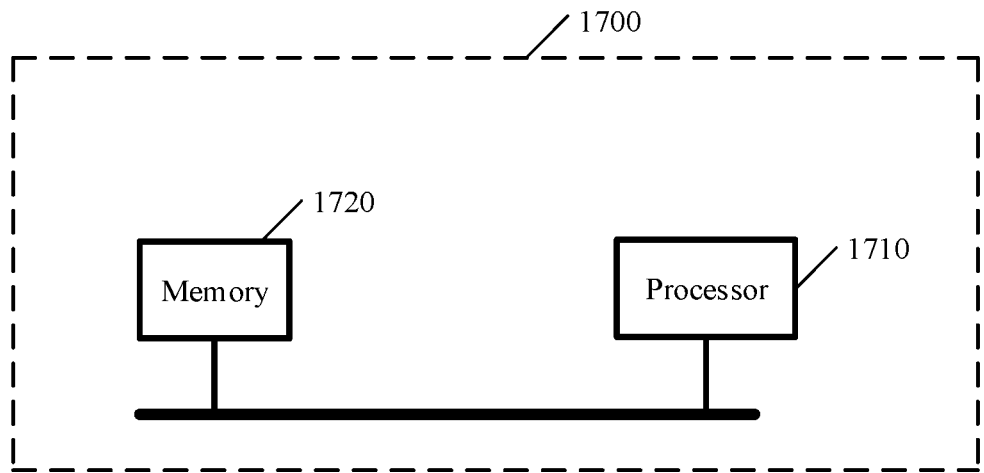

Refer to FIG. 17. An embodiment of this application further provides a service producer 1700, including a processor 1710 and a memory 1720 that are coupled to each other. The processor invokes a program stored in the memory, to perform the following steps: receiving a service request sent by a service communication proxy (SCP), where the service request carries a token, and the token includes a NF set identifier of a service producer; verifying the token; and sending a response to the service request.

Figure 18:
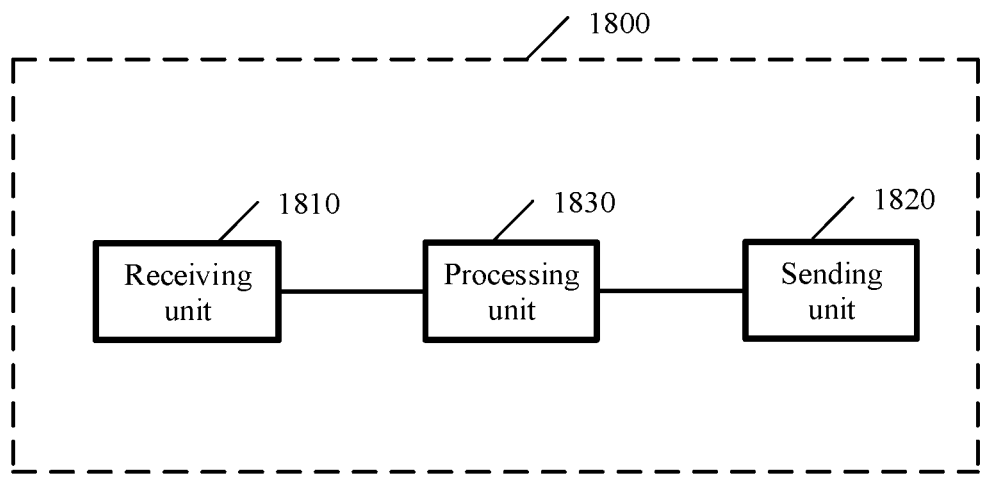
FIG. 18 and FIG. 19 are schematic diagrams of architectures of another two SCPs according to an embodiment of this application.

Refer to FIG. 18. An embodiment of this application further provides an SCP 1800, including:

a receiving unit 1810, configured to receive a service request from a service consumer;

a processing unit 1830, configured to perform service authorization on the service consumer, or request an NRF to perform service authorization on the service consumer; and a sending unit 1820, configured to: when service authorization on the service consumer succeeds, send the service request to a service producer in a NF set of a service producer.

For example, the SCP is further configured to generate a token when service authorization on the service consumer succeeds. The service request sent by the SCP to the service producer carries the token, where the token includes a NF set identifier or a NF service set identifier of the service producer.

For example, when the service producer is a NF, an audience claim of the token includes the NF set identifier of the service producer.

Alternatively, when the service producer is a NF service, a scope claim of the token includes a NF service set identifier of the service producer.

That the processing unit requests the NRF to perform service authorization on the service consumer includes:

sending an authorization request to the NRF, where the authorization request is used to request the NRF to perform service authorization on the service consumer; and receiving a response to the authorization request sent by the NRF, where the response to the authorization request carries a service authorization result of the service consumer from the NRF, and the service authorization result is that service authorization succeeds or that service authorization fails.

For example, the service request carries a service identifier of a requested service, and that the processing unit performs service authorization on the service consumer includes: determining, according to an authorization policy or authorization information locally configured by the SCP, whether the service consumer has permission to access the service that is represented by the service identifier and that is provided by the service producer.

Figure 19:
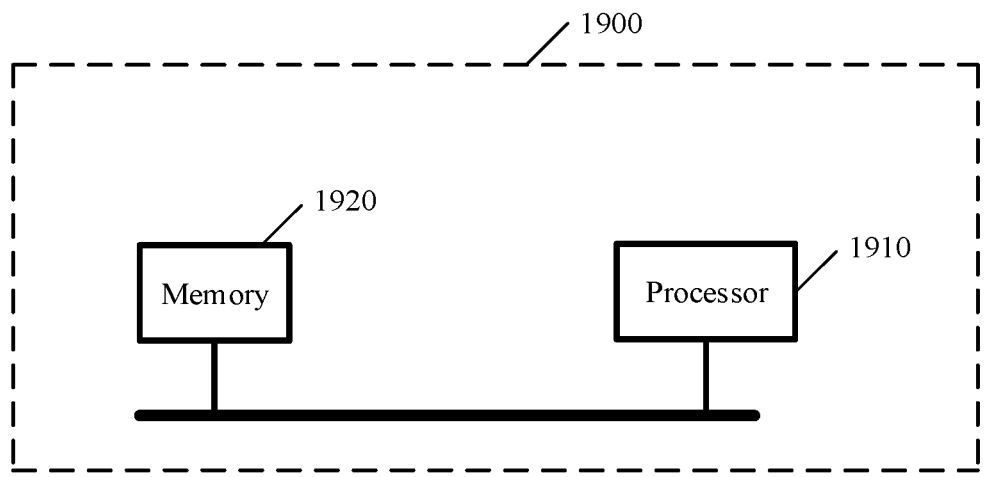

Refer to FIG. 19. An embodiment of this application further provides an SCP 1900, including a processor 1910 and a memory 1920 that are coupled to each other. The processor 1910 invokes a program stored in the memory, to perform the following steps: receiving a service request from a service consumer; performing service authorization on the service consumer, or requesting an NRF to perform service authorization on the service consumer; and when service authorization on the service consumer succeeds, sending the service request to a service producer in a service producer set.

Figure 20:
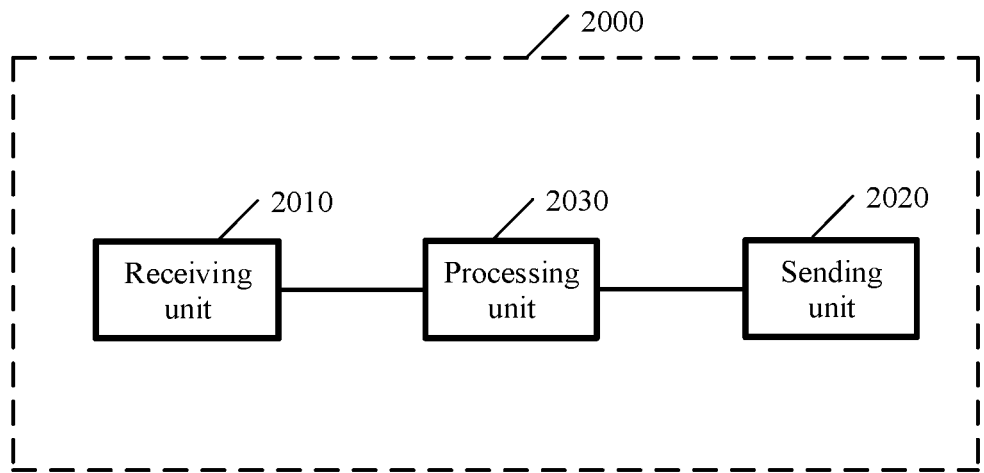
FIG. 20 and FIG. 21 are schematic diagrams of architectures of another two network repository functions according to an embodiment of this application.

Refer to FIG. 20. An embodiment of this application further provides a network repository function 2000, including:

a receiving unit 2010, configured to receive an authorization request carrying a service consumer identifier from a service communication proxy (SCP);

a processing unit 2030, configured to perform service authorization on a service consumer represented by the service consumer identifier; and a sending unit 2020, configured to send a response to the authorization request to the SCP, where the response to the authorization request carries a service authorization result of the service consumer from the NRF, and the service authorization result is that service authorization succeeds or that service authorization fails.

For example, the authorization request carries a service identifier of a requested service. The performing service authorization on the service consumer represented by the service consumer identifier includes: determining, according to an authorization policy or authorization information locally configured by the NRF, whether the service consumer has permission to access the service that is represented by the service identifier and that is provided by a service producer.

Figure 21:
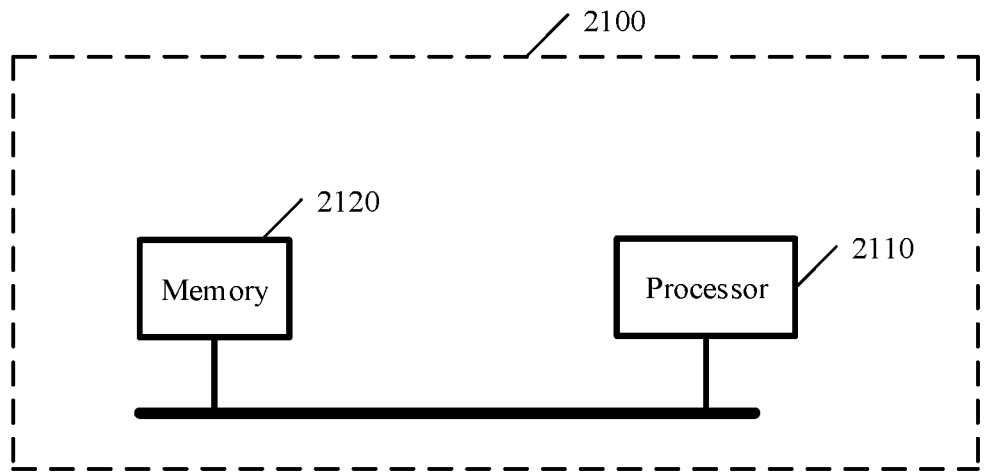

Refer to FIG. 21. An embodiment of this application further provides a network repository function 2100, including a processor 2110 and a memory 2120 that are coupled to each other. The processor invokes a program stored in the memory, to perform the following steps: receiving, from a service communication proxy (SCP), an authorization request carrying a service consumer identifier; performing service authorization on a service consumer represented by the service consumer identifier; and sending a response to the authorization request to the SCP, where the response to the authorization request carries a service authorization result of the service consumer from the NRF, and the service authorization result is that service authorization succeeds or that service authorization fails.

Figure 22:
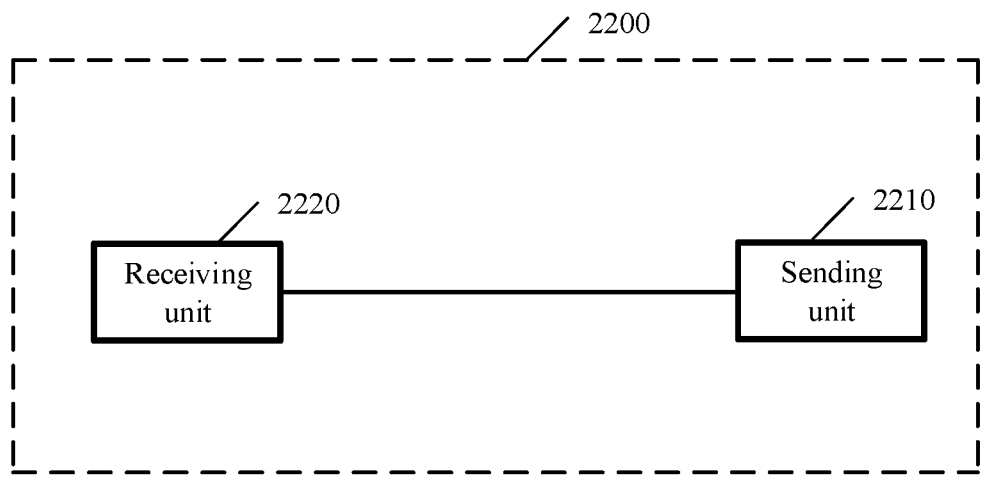
FIG. 22 and FIG. 23 are schematic diagrams of architectures of two service consumers according to an embodiment of this application.

Refer to FIG. 22. An embodiment of this application further provides a service consumer 2200, including:

a sending unit 2210, configured to send a token request to an NRF; and a receiving unit 2220, configured to receive a token request response sent by the NRF, where the token request response carries a token, and the token includes a NF set identifier or a NF service set identifier of a service producer.

The sending unit 2210 is further configured to send a service request carrying the token to a service communication proxy (SCP), where the service request is used by the SCP or the service producer to verify the token.

The receiving unit 2220 is further configured to receive a response to the service request sent by the SCP.

Figure 23:
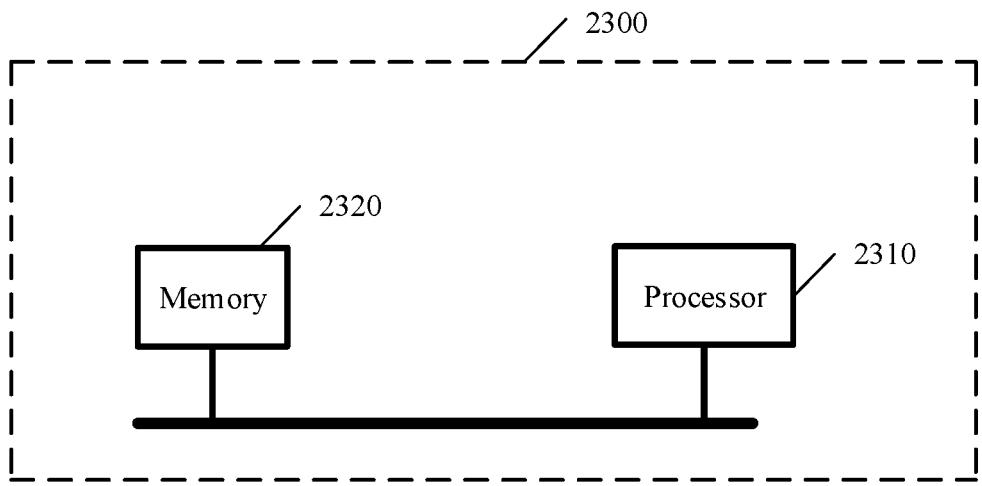

Refer to FIG. 23. An embodiment of this application further provides a service consumer 2300, including a processor 2310 and a memory 2320 that are coupled to each other. The processor 2310 invokes a program stored in the memory, to perform the following step: sending a token request to an NRF; receiving a token request response sent by the NRF, where the token request response carries a token, and the token includes a NF set identifier or a NF service set identifier of a service producer; sending a service request carrying the token to a service communication proxy (SCP), where the service request is used by the SCP or the service producer to verify the token; and receiving a response to the service request sent by the SCP.

Figure 24:
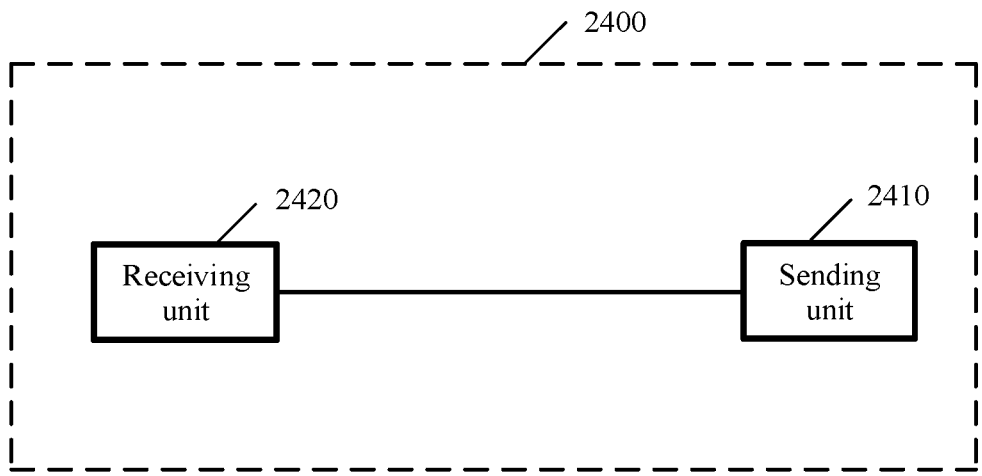
FIG. 24 and FIG. 25 are schematic diagrams of architectures of another two service consumers according to an embodiment of this application.

Refer to FIG. 24. An embodiment of this application further provides a service consumer 2400, including:

a sending unit 2410, configured to send a service request to a service communication proxy (SCP), where the service request includes a NF set identifier or a NF service set identifier of a service producer, where the service request is used by the SCP or a network repository function (NRF) to perform service authorization on the service consumer; and a receiving unit 2420, configured to receive a service response to the service request sent by the SCP.

Figure 25:
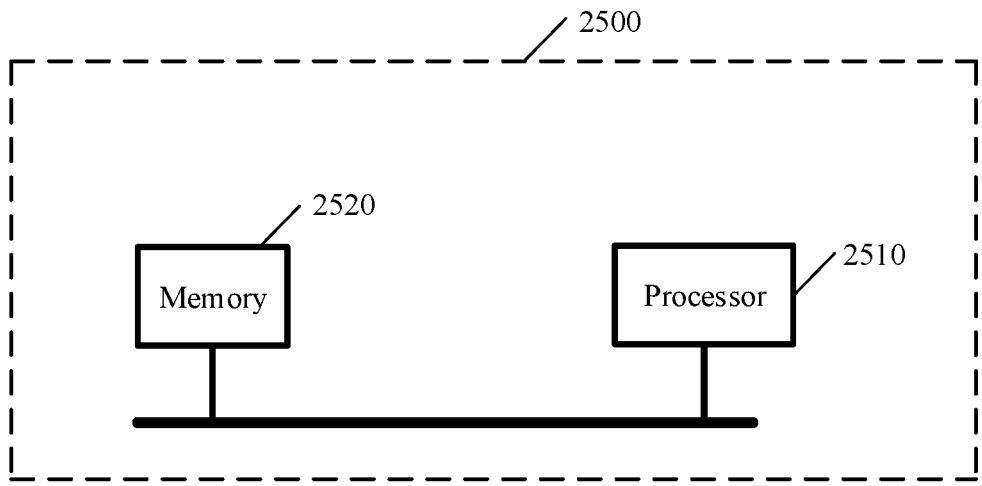

Refer to FIG. 25. An embodiment of this application further provides a service consumer 2500, including a processor 2510 and a memory 2520 that are coupled to each other. The processor 2510 invokes a program stored in the memory, to perform the following steps: sending a service request to a service communication proxy (SCP), where the service request includes a NF set identifier or a NF service set identifier of a service producer, where the service request is used by the SCP or a network repository function (NRF)

to perform service authorization on the service consumer; and receiving a service response to the service request sent by the SCP.

An embodiment of this application further provides a computer-readable storage medium. The computer-readable storage medium stores a computer program, and the computer program is executed by hardware (for example, a processor), to perform some or all of the steps of any method performed by any device in the embodiments of this application.

An embodiment of this application further provides a computer program product including instructions. When the computer program product is run on a computer device, the computer device is enabled to perform some or all of the steps of any method in the foregoing aspects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid state drive), or the like.

In the foregoing embodiments, description of the embodiments has respective focuses. For a part that is not described in detail in an embodiment, refer to related description in other embodiments.

In the foregoing embodiments, the description of the embodiments has respective focuses. For a part that is not described in detail in an embodiment, refer to related description in other embodiments.

In the several embodiments provided in this application, it should be understood that the disclosed apparatus may be implemented in other manners. For example, the described apparatus embodiment is merely an example. For example, the division into units is merely logical function division and may be other division in actual implementation. For example, a plurality of units or components may be combined or integrated into another system, or some features may be ignored or not performed. In addition, the displayed or discussed mutual indirect couplings, direct couplings, or communication connections may be implemented through some interfaces. The indirect couplings or communication connections between the apparatuses or units may be implemented in electronic or other forms.

The units described as separate parts may or may not be physically separate. Parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may include a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, and an optical disc.

What is claimed is:

1. A communication method, comprising:
receiving, by a network repository function, a token request from a service consumer; and
sending, by the network repository function, a token request response to the service consumer, wherein the token request response carries a token, and the token comprises a network function set identifier of a service producer, wherein the network function set identifier of the service producer is an identifier of a network function set to which the service producer belongs, the network function set comprises a plurality of service producers including the service producer, and the token is used for service authorization of each of the plurality of service producers in the network function set,
wherein a claim of the token comprises the newtwork function set identifier of the service producer, and
claim verification of the token includes verifying whether the network function set identifier included in the claim of the token is consistent with a network function set identifier of a service producer that is selected from the network function set in response to a service request from the service consumer.

2. The method according to claim 1, wherein the token request carries one or more of: an identifier of the service producer or the network function set identifier of the service producer.

3. The method according to claim 2, further comprising: when the token request carries the identifier of the service producer, obtaining, by the network repository function based on the identifier of the service producer, the network function set identifier of the service producer, and generating a token comprising the network function set identifier of the service producer; or
when the token request carries the network function set identifier of the service producer, generating, by the network repository function, a token comprising the network function set identifier of the service producer.

4. The method according to claim 1, further comprising:
sending, by the service consumer, the token request to the network repository function; and
receiving, by the service consumer, the token request response from the network repository function.

5. A communication method, comprising:
sending, by a service consumer, a token request to a network repository function; and
receiving, by the service consumer, a token request response from the network repository function, wherein the token request response carries a token, and the token comprises a network function set identifier of a service producer, wherein the network function set identifier of the service producer is an identifier of a network function set to which the service producer belongs, the network function set comprises a plurality of service producers including the service producer, and the token is used for service authorization of each of the plurality of service producers in the network function set,
wherein a claim of the token comprises the network function set identifier of the service producer, and
claim verification of the token includes verifying whether the network function set identifier included in the claim of the token is consistent with an network function set identifier of a service producer that is selected from the network function set in response to a service request from the service consumer.

6. The method according to claim 5, wherein the token request carries one or more of: an identifier of the service producer or the network function set identifier of the service producer.

7. A network repository function, comprising:
a memory storing executable instructions; and
at least one processor coupled to the memory and configured to execute the executable instructions to cause the at least one processor to:
receive a token request from a service consumer; and
send a token request response to the service consumer, wherein the token request response carries a token, and the token comprises a network function set identifier of a service producer, wherein the network function set identifier of the service producer is an identifier of a network function set to which the service producer belongs, the network function set comprises a plurality of service producers including the service producer, and the token is used for service authorization of each of the plurality of service producers in the network function set,
wherein a claim of the token comprises the network function set identifier of the service producer, and
claim verification of the token includes verifying whether the network function set identifier included in the claim of the token is consistent with a network function set identifier of a service producer that is selected from the network function set in response to a service request from the service consumer.

8. The network repository function according to claim 7, wherein the token request carries one or more of: an identifier of the service producer or the network function set identifier of the service producer.

9. The network repository function according to claim 8, wherein the at least one processor is further configured to execute the executable instructions to cause the at least one processor to:
when the token request carries the identifier of the service producer, obtain, based on the identifier of the service producer, the network function set identifier of the service producer, and generate a token comprising the network function set identifier of the service producer; or
when the token request carries the network function set identifier of the service producer, generate a token comprising the network function set identifier of the service producer.

10. A service consumer, comprising:
a memory storing executable instructions; and
at least one processor coupled to the memory and configured to execute the executable instructions to cause the at least one processor to:
send a token request to a network repository function; and
receive a token request response from the network repository function, wherein the token request response carries a token, and the token comprises a network function set identifier of a service producer, wherein the network function set identifier of the service producer is an identifier of an network function set to which the service producer belongs, the network function set comprises a plurality of service producers including the service producer, and the token is used for service authorization of each of the plurality of service producers in the network function set,
wherein an audience claim of the token comprises the network function set identifier of the service producer, and
claim verification of the token includes verifying whether the network function set identifier included in the claim of the token is consistent with a network function set identifier of a service producer that is selected from the network function set in response to a service request from the service consumer.

11. The service consumer according to claim 10, wherein the token request carries one or more of: an identifier of the service producer or the network function set identifier of the service producer.

12. The service consumer according to claim 10, wherein the service producer is a network function belonging to the network function set.

13. The service consumer according to claim 10, wherein the network function set identifier of the service producer is obtained based on an identifier of the service producer or a type of the service producer.

14. The method according to claim 1, wherein the token is for the network function set that includes the plurality of service producers and is defined at the granularity of an network function set.

* * * * *

UNITED STATES PATENT AND TRADEMARK OFFICE
CERTIFICATE OF CORRECTION

PATENT NO. : 12,335,114 B2  
APPLICATION NO. : 17/513895  
DATED : June 17, 2025  
INVENTOR(S) : Xuwen Zhao Page 1 of 1

It is certified that error appears in the above-identified patent and that said Letters Patent is hereby corrected as shown below:

In the Specification

Column 33, Line 32, change "from a web site," to --from a website;--;

Column 33, Line 33, change "to another web site," to --to another website;--;

In the Claims

Column 34, Claim 1, Line 45, change "newtwork;" to --network;--;

Column 35, Claim 5, Line 25, change "with an network;" to --with a network;--;

Column 36, Claim 10, Line 29, change "identifier of an network;" to --identifier of a network;--;

Column 36, Claim 10, Line 34, change "wherein an audience claim;" to --wherein a claim;--; and Column 36, Claim 14, Lines 57 and 58, change "an network;" to --a network;--.

Signed and Sealed this  
Fifteenth Day of July, 2025

Coke Morgan Stewart  
*Acting Director of the United States Patent and Trademark Office*